United States Patent
Hartman

(10) Patent No.: US 10,329,004 B2
(45) Date of Patent: Jun. 25, 2019

(54) WAKEBOAT BALLAST MEASUREMENT ASSEMBLIES AND METHODS

(71) Applicant: Richard L. Hartman, Twin Lakes, ID (US)

(72) Inventor: Richard L. Hartman, Twin Lakes, ID (US)

(*) Notice: Subject to any disclaimer, the term of this patent is extended or adjusted under 35 U.S.C. 154(b) by 0 days.

(21) Appl. No.: 16/255,601

(22) Filed: Jan. 23, 2019

(65) Prior Publication Data
US 2019/0152575 A1    May 23, 2019

Related U.S. Application Data

(63) Continuation-in-part of application No. 15/699,127, filed on Sep. 8, 2017, now Pat. No. 10,227,113.

(60) Provisional application No. 62/385,842, filed on Sep. 9, 2016.

(51) Int. Cl.
| | |
|---|---|
| *B63J 99/00* | (2009.01) |
| *B63B 39/03* | (2006.01) |
| *B63B 11/04* | (2006.01) |
| *G01F 23/26* | (2006.01) |
| *B63B 13/00* | (2006.01) |

(52) U.S. Cl.
CPC ............ *B63J 99/00* (2013.01); *B63B 11/04* (2013.01); *B63B 13/00* (2013.01); *B63B 39/03* (2013.01); *G01F 23/265* (2013.01); *G01F 23/266* (2013.01); *B63J 2099/006* (2013.01)

(58) Field of Classification Search
CPC ......... B63B 35/85; B63B 39/12; B63B 39/03; B63B 39/02; B63B 43/06; B63B 43/04; B63B 43/045; B63B 1/32

USPC ...... 114/121, 122, 123, 124, 125; 701/21, 36
See application file for complete search history.

(56) References Cited

U.S. PATENT DOCUMENTS

| | | |
|---|---|---|
| 4,095,547 A | 6/1978 | Benington |
| 4,135,394 A | 1/1979 | Middleton |
| 4,220,044 A | 9/1980 | LeBlanc et al. |
| 4,749,926 A | 6/1988 | Ontolchik |
| 4,864,287 A | 9/1989 | Kierstead |
| 4,872,118 A | 10/1989 | Naidenov et al. |
| 5,215,015 A | 6/1993 | Talmor |
| 5,324,170 A | 6/1994 | Anastos et al. |

(Continued)

OTHER PUBLICATIONS

Allegro MicroSystems, Inc., "Fully Integrated, Half Effect-Based Linear Current Sensor IC with 2.1 kVRMS Isolation and a Low-Resistance Current Conductor", ACS713-DS, Rev. 11, Oct. 12, 2011, United States, 14 pages.

(Continued)

*Primary Examiner* — Lars A Olson
(74) *Attorney, Agent, or Firm* — Wells St. John P.S.

(57) ABSTRACT

Wakeboat ballast compartment fluid level sensing assemblies are provided that can include: a wakeboat having a hull; a ballast compartment associated with the hull; a nonconductive sensor chamber in fluidic communication with the ballast compartment; and at least one conductive electrode associated with the sensor chamber. Methods for sensing a fluid level within a ballast compartment aboard a wakeboat are also provided. The methods can include maintaining fluid communication between the ballast compartment and a sensor chamber; and determining the electrical communication of electrodes operatively associated with the sensor chamber.

20 Claims, 14 Drawing Sheets

(56) References Cited

U.S. PATENT DOCUMENTS

| | | | |
|---|---|---|---|
| 5,385,110 A | 1/1995 | Bennett et al. | |
| 5,473,497 A | 12/1995 | Beatty | |
| 5,549,071 A | 8/1996 | Pigeon et al. | |
| 5,787,835 A | 8/1998 | Remnant | |
| 5,860,384 A | 1/1999 | Castillo | |
| 6,012,408 A | 1/2000 | Castillo | |
| 6,044,788 A | 4/2000 | Larson et al. | |
| 6,105,527 A | 8/2000 | Lochtefeld et al. | |
| 6,158,375 A | 12/2000 | Stuart, Jr. | |
| 6,234,099 B1 | 5/2001 | Jessen | |
| 6,374,762 B1 | 4/2002 | Larson et al. | |
| 6,427,616 B1 | 8/2002 | Hagen | |
| 6,505,572 B1 | 1/2003 | Seipel et al. | |
| 6,709,240 B1 | 3/2004 | Schmalz et al. | |
| 6,953,002 B2 | 10/2005 | Jessen | |
| 7,311,570 B2 | 12/2007 | Csoke | |
| 7,370,594 B2 | 5/2008 | Bruckner et al. | |
| 7,568,443 B2 | 8/2009 | Walker | |
| 7,699,016 B2 | 4/2010 | Snook et al. | |
| 8,433,463 B1 | 4/2013 | Lieberman | |
| 8,739,723 B1 | 6/2014 | Murphy | |
| 8,761,975 B2 | 6/2014 | Watson | |
| 8,781,976 B1 | 6/2014 | Salmon | |
| 8,798,825 B1* | 8/2014 | Hartman | B63B 39/03 701/21 |
| 8,943,988 B1 | 2/2015 | Guglielmo et al. | |
| 9,499,242 B2 | 11/2016 | Hartman | |
| 9,689,395 B2 | 6/2017 | Hartman | |
| 9,701,366 B2 | 7/2017 | Larson et al. | |
| 9,828,075 B1 | 11/2017 | Hartman | |
| 10,093,398 B1 | 10/2018 | Hartman | |
| 2002/0190687 A1 | 12/2002 | Bell et al. | |
| 2003/0183149 A1 | 10/2003 | Jessen | |
| 2005/0155540 A1 | 7/2005 | Moore | |
| 2005/0226731 A1 | 10/2005 | Mehlhorn et al. | |
| 2006/0009096 A1 | 1/2006 | Takada et al. | |
| 2008/0026652 A1 | 1/2008 | Okanishi et al. | |
| 2009/0144039 A1 | 6/2009 | Thorsteinsson | |
| 2012/0015566 A1 | 1/2012 | Salmon et al. | |
| 2012/0221188 A1 | 8/2012 | Kelly, III | |
| 2013/0103236 A1 | 4/2013 | Mehrgan | |
| 2013/0213293 A1 | 8/2013 | Gasper et al. | |
| 2013/0228114 A1 | 9/2013 | Gasper | |
| 2013/0293881 A1 | 11/2013 | Tokhtuev et al. | |
| 2014/0261135 A1 | 9/2014 | Gasper et al. | |
| 2016/0310711 A1* | 10/2016 | Luxon | A61M 27/00 |
| 2016/0370187 A1 | 12/2016 | Gatland et al. | |

OTHER PUBLICATIONS

Analog Devices, Inc., "High Accuracy, Dual-Axis Digital Inclinometer and Accelerometer", ADIS16209, Rev. B, 2009, United States, 16 pages.

Analog Devices, Inc., "Programmable 360° Inclinometer", ADIS16203, Rev. A, 2010, United States, 28 pages.

Johnson Pumps et al., "Ultra Ballast—Self-Priming, Flexible Impeller Pump Flange Mounted to DC Motorn 12/24 V", Johnson Ultra Ballast Pump Instruction Manual, 2009, United States, 5 pages.

Medallion Instrumentation Systems, "TigeTouch", Instruction Guide, 15 pages.

Microchip Technology, Inc. "28/40/44/64-Pin, Enhanced Flash Microcontrollers with ECAN™ and NanoWatt XLP Technology", PIC18F66K80 Family, 2010-2012, United States, 622 pages.

Rule, "Tournament Series Livewell/Baitwell Pumps,", Instruction Guide, Rev A, Jun. 2006, Untied States, 2 pages.

Texas Instruments, "Fast General-Purpose Operational Amplifiers,", SLOS063B, Revised Dec. 2002, United States, 16 pages.

* cited by examiner

Front of engine showing pulleys and serpentine belt with addition of direct-drive water pump Front of engine showing pulleys and serpentine belt without addition of direct-drive water pump

WAKEBOAT BALLAST MEASUREMENT ASSEMBLIES AND METHODS

CROSS REFERENCE TO RELATED APPLICATION

This application is a continuation-in-part of U.S. patent application Ser. No. 15/699,127 which was filed Sep. 8, 2017, entitled "Wakeboat Engine Powered Ballasting Apparatus and Methods", which claims priority to U.S. provisional patent application Ser. No. 62/385,842 which was filed Sep. 9, 2016, entitled "Wakeboat Engine Powered Ballasting Apparatus and Methods", the entirety of each of which is incorporated by reference herein.

TECHNICAL FIELD

The present disclosure relates to watercraft and in particular embodiments wakeboat engine powered ballasting apparatus and methods.

BACKGROUND

Watersports involving powered watercraft have enjoyed a long history. Waterskiing's decades-long popularity spawned the creation of specialized watercraft designed specifically for the sport. Such "skiboats" are optimized to produce very small wakes in the water behind the watercraft's hull, thereby providing the smoothest possible water to the trailing water skier.

More recently, watersports have arisen which actually take advantage of, and benefit from, the wake produced by a watercraft. Wakesurfing, wakeboarding, wakeskating, and kneeboarding all use the watercraft's wake to allow the participants to perform various maneuvers or "tricks" including becoming airborne.

As with waterskiing "skiboats", specialized watercraft known as "wakeboats" have been developed for the wakesurfing, wakeboarding, wakeskating, and/or kneeboarding sports. Contrary to skiboats, however, wakeboats seek to enhance (rather than diminish) the wake produced by the hull using a variety of techniques.

To enhance the wake produced by the hull, water can be pumped aboard from the surrounding water to ballast the wakeboat. Unfortunately, existing art in this area is fraught with time limitations, compromises, challenges, and in some cases outright dangers to the safe operation of the wakeboat.

SUMMARY OF THE DISCLOSURE

Wakeboat ballast compartment fluid level sensing assemblies are provided that can include: a wakeboat having a hull; a ballast compartment associated with the hull; a nonconductive sensor chamber in fluidic communication with the ballast compartment; and at least one conductive electrode associated with the sensor chamber.

Methods for sensing a fluid level within a ballast compartment aboard a wakeboat are also provided. The methods can include maintaining fluid communication between the ballast compartment and a sensor chamber; and determining the electrical communication across a pair of electrodes operatively associated with the sensor chamber.

The present disclosure provides apparatus and methods that improves the speed, functionality, and safety of wakeboat ballasting operations. A ballasting apparatus for wakeboats is provided, comprising a wakeboat with a hull and an engine; a hydraulic pump, mechanically driven by the engine; a hydraulic motor, powered by the hydraulic pump; a ballast compartment; and a ballast pump, powered by the hydraulic motor. A ballasting apparatus for wakeboats is provided, comprising a wakeboat with a hull and an engine; a ballast compartment; and a hydraulic ballast pump, the ballast pump configured to be powered by the engine, the ballast outlet and/or inlet of the ballast pump connected to the ballast compartment, the ballast pump configured to pump ballast in and/or out of the ballast compartment. A ballast pump priming system for wakeboats is provided, comprising a wakeboat with a hull and an engine; a ballast pump on the wakeboat; a fitting on the ballast pump which permits water to be introduced into the housing of the ballast pump; and a source of pressurized water, the pressurized water being fluidly connected to the fitting, the pressurized water thus flowing into the housing of the ballast pump.

DRAWINGS

Embodiments of the disclosure are described below with reference to the following accompanying drawings, which are not necessarily to scale.

DESCRIPTION

This disclosure is submitted in furtherance of the constitutional purposes of the U.S. Patent Laws "to promote the progress of science and useful arts" (Article 1, Section 8).

The assemblies and methods of the present disclosure will be described with reference to FIGS. 1-14.

Participants in the sports of wakesurfing, wakeboarding, wakeskating, and other wakesports often have different needs and preferences with respect to the size, shape, and orientation of the wake behind a wakeboat. A variety of schemes for creating, enhancing, and controlling a wakeboat's wake have been developed and marketed with varying degrees of success.

The predominant technique for controlling the wake produced by a wakeboat is water itself—brought onboard the wakeboat from the surrounding body of water as a ballast medium to change the position and attitude of the wakeboat's hull in the water. Ballast compartments are installed in various locations within the wakeboat, and one or more ballast pumps are used to fill and empty the compartments. The resulting ballast system can control and/or adjust the amount and distribution of weight within the watercraft.

Figure 1:
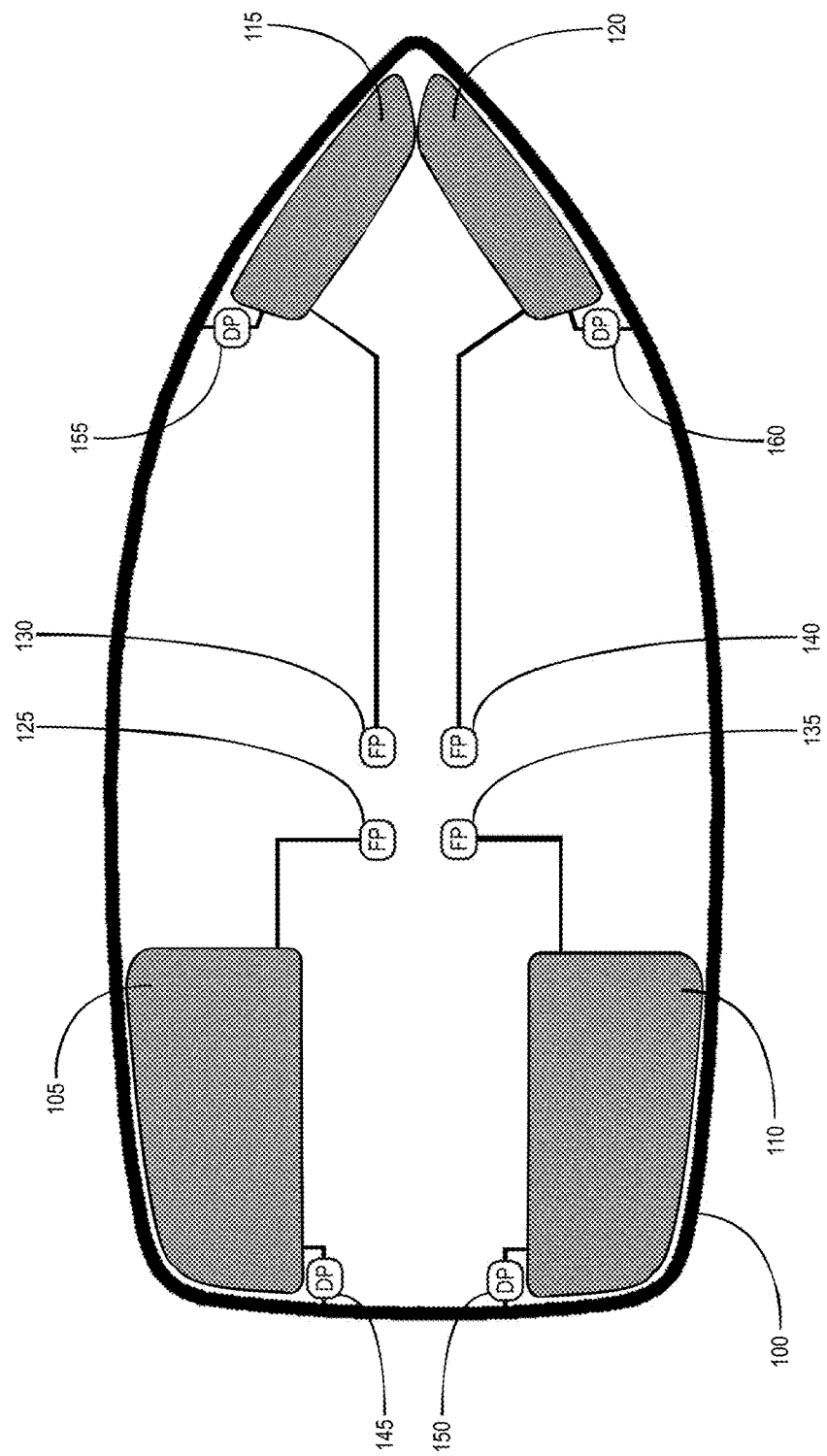
FIG. 1 illustrates a configuration of a wakeboat ballast system according to an embodiment of the disclosure.

FIG. 1 illustrates one configuration of a wakeboat ballast system for example purposes only. Within confines of a wakeboat hull 100, four ballast compartments are provided: A port aft (left rear) ballast compartment 105, a starboard aft (right rear) ballast compartment 110, a port bow (left front) ballast compartment 115, and a starboard bow (right front) ballast compartment 120.

Two electric ballast pumps per ballast compartment can be provided to, respectively, fill and drain each ballast compartment. For example, ballast compartment 105 is filled by Fill Pump (FP) 125 which draws from the body of water in which the wakeboat sits through a hole in the bottom of the wakeboat's hull, and is drained by Drain Pump (DP) 145 which returns ballast water back into the body of water. Additional Fill Pumps (FP) and Drain Pumps (DP) operate in like fashion to fill and drain their corresponding ballast compartments. While FIG. 1 depicts separate fill and drain pumps for each ballast compartment, other pump arrangements can include a single, reversible pump for each compartment that both fills and drains that compartment. The advantages and disadvantages of various pump types will be discussed later in this disclosure.

FIG. 1 depicts a four-compartment ballast system, for example. Other arrangements and compartment quantities may be used. Some wakeboat manufacturers install a compartment along the centerline (keel) of the hull, for example. Some designs use a single wider or horseshoe shaped compartment at the front (bow) instead of two separate compartments. Many configurations are possible and new arrangements continue to appear.

The proliferation of wakeboat ballast systems and centralized vessel control systems has increased their popularity, but simultaneously exposed many weaknesses and unresolved limitations. One of the most serious problems was, and continues to be, the speed at which the electric ballast pumps can fill, move, and drain the water from the ballast compartments.

While more ballast is considered an asset in the wakeboating community (increased ballast yields increased wake size), large amounts of ballast can quickly become a serious, potentially even life threatening, liability if something goes wrong. Modern wakeboats often come from the factory with ballast compartments that can hold surprisingly enormous volumes and weights of water. As just one example, the popular Malibu 25LSV wakeboat (Malibu Boats, Inc., 5075 Kimberly Way, Loudon Tenn. 37774, United States) has a manufacturer's stated ballast capacity of 4825 pounds. The significance of this figure becomes evident when compared against the manufacturer's stated weight of the wakeboat itself: Just 5600 pounds.

The ballast thus nearly doubles the vessel's weight. While an advantage for wakesports, that much additional weight becomes a serious liability if, for some reason, the ballast compartments cannot be drained fast enough. One class of popular electric ballast pump is rated by its manufacturer at 800 GPH; even if multiple such pumps are employed, in the event of an emergency it could be quite some time before all 4825 pounds of ballast could be evacuated.

During those precious minutes, the ballast weight limits the speed at which the vessel can move toward safety (if, indeed, the emergency permits it to move at all). And once at the dock, a standard boat trailer is unlikely to accommodate a ballasted boat (for economy, boat trailers are manufactured to support the dry weight of the boat, not the ballasted weight). The frame, suspension, and tires of a boat trailer rated for a 5,600 pound wakeboat are unlikely to safely and successfully support one that suddenly weighs over 10,000 pounds. Getting the boat safely on its trailer, and safely out of the water, may have to wait until the ballast can finish being emptied.

If the time necessary to drain the ballast exceeds that permitted by an emergency, the consequences may be dire indeed for people and equipment alike. Improved apparatus and methods for rapidly draining the ballast compartments of a wakeboat are of significant value in terms of both convenience and safety.

Another aspect of wakeboat ballasting is the time required to initially fill, and later adjust, the ballast compartments. Modern wakeboats can require ten minutes or more to fill their enormous ballast compartments. The time thus wasted is one of the single most frequent complaints received by wakeboat manufacturers. Improved apparatus and methods that reduce the time necessary to prepare the ballast system for normal operation are of keen interest to the industry.

Yet another aspect of wakeboat ballasting is the time required to make adjustments to the levels in the various ballast compartments. Consistency of the wake is of paramount importance, both for professional wakesport athletes and casual participants. Even small changes in weight distribution aboard the vessel can affect the resulting wake behind the hull; a single adult changing seats from one side to the other has a surprising effect. Indeed, rearranging such "human ballast" is a frequent command from wakeboat operators seeking to maintain the wake. A 150 pound adult moving from one side to the other represents a net 300 pound shift in weight distribution. The wakeboat operator must compensate quickly for weight shifts to maintain the quality of the wake.

The 800 GPH ballast pump mentioned above moves (800/60=) 13.3 gallons per minute, which at 8.34 pounds per gallon of water is 111 pounds per minute. Thus, offsetting the movement of the above adult would take (150/111=) 1.35 minutes. That is an exceedingly long time in the dynamic environment of a wakeboat; it is very likely that other changes will occur during the time that the operator is still working to adjust for the initial weight shift.

This inability to react promptly gives the wakeboat operator a nearly impossible task: Actively correct for very normal and nearly continuous weight shifts using slow water pumps, while still safely steering the wakeboat, while still monitoring the safety of the athlete in the wake, while still monitoring the proper operation of the engine and other systems aboard the vessel.

In addition to all of the other advantages, improved apparatus and methods that can provide faster compensation for normal weight shifts is of extreme value to wakeboat owners and, thus, to wakeboat manufacturers.

Another consideration for wakeboat ballast systems is that correcting for weight shifts is not just a matter of pumping a single ballast compartment. The overall weight of the vessel has not changed; instead, the fixed amount of weight has shifted. This means an equivalent amount of ballast must be moved in the opposite direction—without changing the overall weight. In the "moving adult" example, 150 pounds of water must be drained from one side, and 150 pounds of water must be added to the other side, while maintaining the same overall weight of the wakeboat. This means TWO ballast pumps must be operating simultaneously.

Interviews with industry experts and certified professional wakeboat drivers reveal that correcting for a typical weight shift should take no more than 5-10 seconds. Based on the 150 pound adult example, that means (150/8.34=) 18 gallons of water must be moved in 5-10 seconds. To achieve that, each water pump in the system must deliver 6500 to 13,000 GPH. That is 4-8 times more volume than the wakeboat industry's standard ballast pumps described above.

The fact that today's ballast pumps are 4-8 times too small illustrates the need for an improved, high volume wakeboat ballast system design.

One reaction to "slow" ballast pumps may be "faster" ballast pumps. In water pump technology "more volume per unit time" means "larger", and, indeed, ever larger ballast pumps have been tried in the wakeboat industry. One example of a larger electric ballast pump is the Rule 209B (Xylem Flow Control, 1 Kondelin Road, Cape Ann Industrial Park, Gloucester Mass. 01930, United States), rated by its manufacturer at 1600 GPH. Strictly speaking the Rule 209B is intended for livewell applications, but in their desperation for increased ballast pumping volume, wakeboat manufacturers have experimented with a wide range of electric water pumps.

The Rule 209B's 1600 GPH rating is fully twice that of the Tsunami T800 (800 GPH) cited earlier. Despite this doubling of volume, the Rule 209B and similarly rated pumps fall far short of the 6500 to 13,000 GPH required—and their extreme electrical requirements begin to assert themselves.

As electric ballast pumps increase in water volume and size, they also increase in current consumption. The Rule 209B just discussed draws 10 amperes from standard 13.6V wakeboat electrical power. This translates to 136 watts, or 0.18 horsepower (HP). Due to recognized mechanical losses of all mechanical devices, not all of the consumed power results in useful work (i.e. pumped water). A great deal is lost to waste heat in water turbulence, I2R electrical losses in the motor windings, and the motor bearings to name just a few.

At the extreme end of the 12 VDC ballast pump spectrum are water pumps such as the Rule 17A (Xylem Flow Control, 1 Kondelin Road, Cape Ann Industrial Park, Gloucester Mass. 01930, United States), rated by its manufacturer at a sizable (at least for electric water pumps) 3800 GPH. To achieve this, the Rule 17A draws 20 continuous amperes at 13.6V, thus consuming 272 electrical watts and 0.36 HP. It is an impressive electrical ballast pump by any measure.

Yet, even with this significant electrical consumption, it would require two separate Rule 17A pumps running in parallel to achieve even the minimum acceptable ballast flow of 6500 GPH. And doing so would require 40 amperes of current flow. Duplicate this for the (at least) two ballast compartments involved in a weight shift compensation as described above, and the wakeboat now has 80 amperes of current flowing continuously to achieve the low end of the acceptable ballast flow range.

80 amperes is a very significant amount of current. For comparison, the largest alternators on wakeboat engines are rated around 1200 W of output power, and they need to rotate at approximately 5000 RPM to generate that full rated power. Yet here, to achieve the minimum acceptable ballast flow range, four ballast pumps in the Rule 17A class would consume (4×272 W=) 1088 W. Since most wakeboat engines spend their working time in the 2000-3000 RPM range, it is very likely that the four Rule 17A class water pumps would consume all of the alternator's available output—with the remainder supplied by the vessel's batteries. In other words, ballasting operations would likely be a drain on the boat's batteries even when the engine is running; never a good idea when the boat's engine relies on those batteries to be started later that day.

If the wakeboat's engine is not running, then those 80 continuous amperes must be supplied by the batteries alone. That is an electrical demand that no wakeboat battery bank can sustain safely, or for any length of time.

Even larger electric ballast pumps exist such as those used on yachts, tanker ships, container ships, and other ocean-going vessels. The motors on such pumps require far higher voltages than are available on the electrical systems of wakeboats. Indeed, such motors often require three phase AC power which is commonly available on such large vessels. These enormous electric ballast pumps are obviously beyond the mechanical and electrical capacities of wakeboats, and no serious consideration can be given to using them in this context.

The problem of moving enough ballast water fast enough is, simply, one of power transfer. Concisely stated, after accounting for the electrical and mechanical losses in various parts of the ballast system, about 2 HP is required to move the 6500-13,000 GPH required by each ballast pump. Since two pumps must operate simultaneously to shift weight distribution without changing total weight, a total of 4 horsepower must be available for ballast pumping.

4 HP is approximately 3000 watts, which in a 13.6 VDC electrical system is 220 continuous amperes of current flow. To give a sense of scale, the main circuit breaker serving an entire modern residence is generally rated for only 200 amperes.

In addition to the impracticality of even achieving over two hundred continuous amperes of current flow in a wakeboat environment, there is the enormous expense of components that can handle such currents. The power cabling alone is several dollars per foot. Connectors of that capacity are enormously expensive, as are the switches, relays, and semiconductors to control it. And all of these components must be scaled up to handle the peak startup, or "in-rush", current that occurs with inductive loads such as electric motors, which is often twice or more the continuous running current.

Then there is the safety issue. Circuits carrying hundreds of amps running around on a consumer watercraft is a dangerous condition. That much current flow represents almost a direct short across a lead-acid battery, with all of the attendant hazards.

Moving large volumes of ballast water is a mechanical activity requiring mechanical power. To date, most wakeboat ballast pumping has been done using electric ballast pumps. But as the above discussion makes clear, electricity is not a viable method for conveying the large amounts of power necessary to achieve the required pumping volumes.

The conversion steps starting with the mechanical energy of the engine, motor, or other prime mover on the vessel (hereinafter "engine" for brevity), then to electrical energy, and then finally back to mechanical energy that actually moves the water, introduces far too many inefficiencies, hazards, costs, and impracticalities when dealing with multiple horsepower. Part of the solution must thus be apparatus and methods of more directly applying the mechanical energy of the engine to the mechanical task of moving ballast water, without the intermediate electrical conversions common to the wakeboat industry.

Some boat designs use two forward facing scoops to fill its ballast compartments, and two rear facing outlets to drain its ballast compartments, relying on forward motion of the boat as driven by the engine.

These designs suffer from several distinct and potentially dangerous disadvantages. Chief among these is the absolute dependency on boat motion to drain water from the ballast compartments. If the boat cannot move forward at a sufficient velocity to activate the draining operation ("on plane", generally at least 10 MPH depending on hull design), the ballast compartments literally cannot be drained.

There are countless events and mishaps that can make it impossible to propel the boat with sufficient velocity to activate such passive draining schemes. Striking a submerged object—natural or artificial—can damage the propeller, or the propeller shaft, or the propeller strut, or the outdrive. Damage to the rudder can prevent straightline motion of sufficient speed. Wrapping a rope around the propshaft or propeller can restrict or outright prevent propulsion. Damage to the boat's transmission or v-drive can also completely prevent movement. The engine may be running fine, yet due to problems anywhere in the various complex systems between the engine and the propeller, the boat may be unable to move fast enough to drain ballast—if it can move at all.

As noted earlier, being stranded in the water while unable to drain the ballast can be a life-threatening situation. A ballasted boat is just that much more difficult and time consuming to manually paddle (or tow with another boat) back to the dock. And as further noted above, once back to the dock it is very likely that the boat's trailer cannot pull the boat out of the water until some alternative, emergency method is found to remove the thousands of pounds of additional ballast.

Another disadvantage of such "passive" schemes is that they are incapable of actively pressurizing the water; they rely solely on the pressure caused by the forward motion of the boat. To compensate for such low pressure, unusually large inlet and outlet orifices with associated large water valves (often 3-4 inches in diameter) must be used to allow sufficient volumes of water to flow at such low pressures. The cost, maintenance, and reliability of such enormous valves is a known and continuing challenge.

The present disclosure provides apparatus and methods for filling, moving, and draining ballast compartments using the mechanical power of the engine. The apparatus and methods can provide this filling, moving and draining without intermediate electrical conversion steps, and/or while not requiring the hull to be in motion.

One embodiment of the present disclosure uses mechanical coupling, or "direct drive", to transfer power to one or more ballast pumps that are mounted directly to the engine. The power coupling may be via direct shaft connection, gear drive, belt drive, or another manner that suits the specifics of the application.

A block diagram of an engine mounted, direct drive ballast pump is shown in FIG. 2. In this embodiment, engine power is conveyed to the pump via the engine's serpentine belt. In other embodiments, engine power can be conveyed via direct crankshaft drive, gear drive, the addition of secondary pulleys and an additional belt, or other techniques.

Figure 2B:
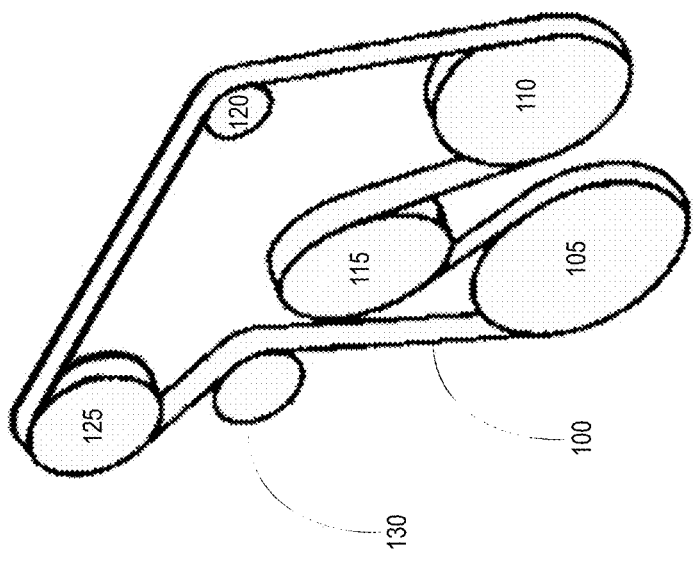
FIGS. 2A and 2B illustrate examples of routing a serpentine belt on a wakeboat engine, and on a wakeboat engine with the addition of a direct drive ballast pump in keeping with one embodiment of the present disclosure.
Figure 2A:
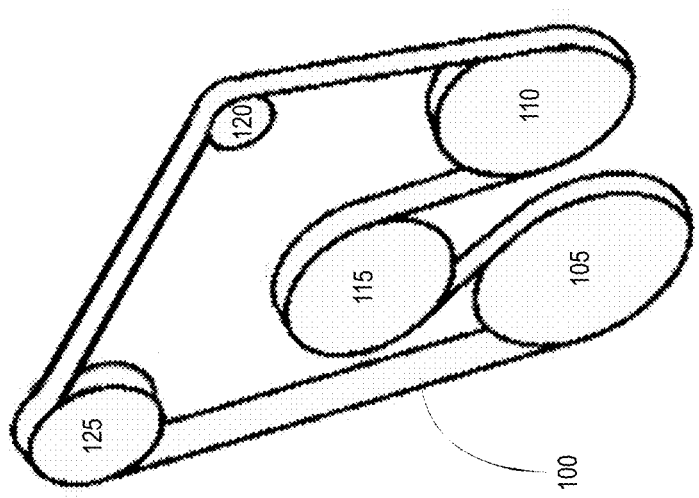

FIG. 2 shows the pulleys and belt that might be present on a typical wakeboat engine. In FIG. 2A, serpentine belt 100 passes around crankshaft pulley 105, which is driven by the engine and conveys power to belt 100. Belt 100 then conveys engine power to accessories on the engine by passing around pulleys on the accessories. Such powered accessories may include, for example, an alternator 110, a raw water pump 115, and a circulation pump 125. An idler tensioning pulley 120 maintains proper belt tension.

FIG. 2B depicts how serpentine belt 100 might be rerouted with the addition of direct drive ballast pump 130. Belt 100 still provides engine power to all of the other engine mounted accessories as before, and now also provides engine power to ballast pump 130 via its pulley.

A longer belt may be necessary to accommodate the additional routing length of the ballast pump pulley. The ballast pump and its pulley may also be installed in a different location than that shown in FIG. 2B depending upon the engine, other accessories, and available space within the engine compartment.

Most such engine accessories are mounted on the "engine side" of their belt pulleys. However, an alternative mounting technique, practiced in other configurations, mounts the body of the ballast pump on the opposite side of its pulley 130, away from the engine itself, while keeping its pulley in line with the belt and other pulleys. Modern marine engines are often quite tightly packaged with very little free space within their overall envelope of volume. This alternative mounting technique can provide extra engine accessories, such as the engine powered pumps of the present disclosure, to be added when otherwise no space is available. In some embodiments such engine powered pumps may have a clutch associated with pulley 132, for reasons described later herein.

Certain other embodiments mount the ballast pump away from the engine for reasons including convenience, space availability, or serviceability. In such remote mounted embodiments the aforementioned belt or shaft drives may still be used to convey mechanical power from the engine to the pump. Alternately, another power conveyance technique may be used such as a flexible shaft; connection to Power Take Off (PTO) point on the engine, transmission, or other component of the drivetrain; or another approach as suitable for the specifics of the application.

A suitable direct drive ballast pump can be engine driven and high volume. An example of such a pump is the Meziere WP411 (Meziere Enterprises, 220 South Hale Avenue, Escondido Calif. 92029, United States). The WP411 is driven by the engine's belt just as other accessories such as the cooling pump and alternator, thus deriving its motive force mechanically without intermediate conversion steps to and from electrical power.

The WP411 water pump can move up to 100 GPM, but requires near-redline engine operation of about 6500 RPM to do so. At a typical idle of 650 RPM (just 10% of the aforementioned requirement), the WP411 flow drops to just 10 GPM.

In other vehicular applications, this high RPM requirement might not present a problem as the velocity can be decoupled from the engine RPM via multiple gears, continuously variable transmissions, or other means. But in a watercraft application, the propeller RPM (and thus hull speed) is directly related to engine RPM. Wakeboat transmissions and v-drives are fixed-ratio devices allowing forward and reverse propeller rotation at a fixed relationship to the engine RPM. Thus to achieve the design performance of a water pump such as the WP411, it must be permissible to run the engine at maximum (also known as "wide open throttle", or WOT). This means either travelling at maximum velocity, or having the transmission out of gear and running the engine at WOT while sitting still in the water.

These extremes—sitting still or moving at maximum speed—are not always convenient. If the goal is to move the ballast at 100 GPM while the wakeboat is under normal operation (i.e. travelling at typical speeds at typical mid-range engine RPM's), then the ballast pump(s) must be increased in size to provide the necessary GPM at those lower engine RPM's. And if, as is very often the case, the ballast is to be filled or drained while at idle (for example, in no-wake zones), then the ballast pump(s) can experience an RPM ratio of 10:1 or greater. This extreme variability of engine RPM and its direct relationship to direct-drive ballast pump performance forces compromises in component cost, size, and implementation.

To accommodate these range-of-RPM challenges, some embodiments of the present disclosure use a clutch to selectively (dis)connect the engine belt pulley to the ballast pump(s). An example of such a clutch is the Warner Electric World Clutch for Accessory Drives (Altra Industrial Motion, 300 Granite Street, Braintree Mass. 02184, United States). The insertion of a clutch between the belt pulley and the ballast pump allows the ballast pump to be selectively powered and depowered based on pumping requirements, thereby minimizing wear on the ballast pump and load on the engine. A clutch also permits the ballast pump to be decoupled if the engine's RPM exceeds the rating of the ballast pump, allowing flexibility in the drive ratio from engine to ballast pump and easing the challenge of sizing the ballast pump to the desired RPM operational range in fixed-ratio watercraft propulsion systems.

Direct drive ballast pumps thus deliver a substantial improvement over the traditional electrical water pumps discussed earlier. In accordance with example implementations, these pumps may They achieve the goals of 1) using the mechanical power of the engine, 2) eliminating intermediate electrical conversion steps, and/or 3) not requiring the hull to be in motion.

However, the direct-coupled nature of direct drive ballast pumps makes them susceptible to the RPM's of the engine on a moment by moment basis. If direct drive ballast pumps are sized to deliver full volume at maximum engine RPM, they may be inadequate at engine idle. Likewise, if direct drive ballast pumps are sized to deliver full volume at engine idle, they may be overpowerful at higher engine RPM's, requiring all components of the ballast system to be overdesigned.

Another difficulty with direct drive ballast pumps is the routing of hoses or pipes from the ballast chambers. Requiring the water pumps to be physically mounted to the engine forces significant compromises in the routing of ballast system plumbing. Indeed, it may be impossible to properly arrange for ballast compartment draining if the bottom of a compartment is below the intake of an engine mounted ballast pump. Pumps capable of high volume generally require positive pressure at their inlets and are not designed to develop suction to lift incoming water, while pumps which can develop inlet suction are typically of such low volume that do not satisfy the requirements for prompt ballasting operations.

Further improvement is thus desirable, to achieve the goals of the present disclosure while eliminating 1) the effect of engine RPM on ballast pumping volume, and/or 2) the physical compromises of engine mounted water pumps. Some embodiments of the present disclosure achieve this, without intermediate electrical conversion steps, by using one or more direct drive hydraulic pumps to convey mechanical power from the engine to remotely located ballast pumps.

Just because hydraulics are involved may not eliminate the need for ballast pumping power to emanate from the engine. For example, small hydraulic pumps driven by electric motors have been used on some wakeboats for low-power applications such as rudder and trim plate positioning. However, just as with the discussions regarding electric ballast pumps above, the intermediate conversion step to and back from electrical power exposes the low-power limitations of these electrically driven hydraulic pumps. Electricity remains a suboptimal way to convey large amounts of mechanical horsepower for pumping ballast.

For example, the SeaStar AP1233 electrically driven hydraulic pump (SeaStar Solutions, 1 Sierra Place, Litchfield Ill. 62056, United States) is rated at only 0.43 HP, despite being the largest of the models in the product line. Another example is the Raymarine ACU-300 (Raymarine Incorporated, 9 Townsend West, Nashua N.H. 03063, United States) which is rated at just 0.57 HP, again the largest model in the lineup. These electrically driven hydraulic pumps do an admirable job in their intended applications, but they are woefully inadequate for conveying the multiple horsepower necessary for proper wakeboat ballast pumping.

As with electric ballast pumps, even larger electrically driven hydraulic pumps exist such as those used on yachts, tanker ships, container ships, and other ocean-going vessels. The motors on such pumps run on far higher voltages than are available on wakeboats, often requiring three phase AC power which is commonly available on such large vessels. These enormous electrically driven hydraulic pumps are obviously beyond the mechanical and electrical capacities of wakeboats, and no serious consideration can be given to using them in this context.

Some automotive (non-marine) engines include power steering hydraulic pumps. But just as with turning rudders and moving trim plates, steering a car's wheels is a low power application. Automotive power steering pumps typically convey only $\frac{1}{20}$th HP when the engine is idling, at relatively low pressures and flow rates. This is insufficient to power even a single ballast pump, let alone two at a time.

To overcome the above limitations, embodiments of the present disclosure may add one or more hydraulic pumps, mounted on and powered by the engine. The resulting direct drive provides the hydraulic pump with access to the engine's high native horsepower via the elimination of intermediate electrical conversions. The power coupling may be via shaft connection, gear drive, belt drive, or another manner that suits the specifics of the application.

Referring back to the belt drive approach of FIG. 2 reveals one technique of many for powering a hydraulic pump from the engine of a wakeboat. In some embodiments, the hydraulic pump can be powered by pulley 130 of FIG. 2B and thus extract power from the engine of the wakeboat via the serpentine belt used to power other accessories already on the engine.

Some other embodiments mount the hydraulic pump away from the engine for reasons including convenience, space availability, or serviceability. In such remote mounted embodiments the aforementioned belt or shaft drives may still be used to convey mechanical power from the engine to the pump. Alternately, another power conveyance technique may be used such as a flexible shaft; connection to Power Take Off (PTO) point on the engine, transmission, or other component of the drivetrain; or another approach as suitable for the specifics of the application.

One example of such a direct drive hydraulic pump is the Parker Gresen PGG series (Parker Hannifin Corporation, 1775 Logan Avenue, Youngstown Ohio 44501, United States). The shaft of such hydraulic pumps can be equipped with a pulley, gear, direct shaft coupling, or other connection as suits the specifics of the application.

The power transferred by a hydraulic pump to its load is directly related to the pressure of the pumped hydraulic fluid (commonly expressed in pounds per square inch, or PSI) and the volume of fluid pumped (commonly expressed in gallons per minute, or GPM) by the following equation:

$$HP=((PSI \times GPM)/1714)$$

The conveyance of a certain amount of horsepower can be accomplished by trading off pressures versus volumes. For example, to convey 2 HP to a ballast pump as discussed earlier, some embodiments may use a 1200 PSI system. Rearranging the above equation to solve for GPM:

$$((2\ HP \times 1714)/1200\ PSI)=2.86\ GPM$$

and thus a 1200 PSI system would require a hydraulic pump capable of supplying 2.86 gallons per minute of pressurized hydraulic fluid for each ballast pump that requires 2 HP of conveyed power.

Other embodiments may prefer to emphasize hydraulic pressure over volume, for example to minimize the size of the hydraulic pumps and motors. To convey the same 2 HP as the previous example in a 2400 PSI system, the equation becomes:

$$((2\ HP \times 1714)/2400\ PSI)=1.43\ GPM$$

and the components in the system would be resized accordingly.

A significant challenge associated with direct mounting of a hydraulic pump on a gasoline marine engine is RPM range mismatch. For a variety of reasons, the vast majority of wakeboats use marinized gasoline engines. Such engines have an RPM range of approximately 650-6500, and thus an approximate 10:1 range of maximum to minimum RPM's.

Hydraulic pumps are designed for an RPM range of 600-3600, or roughly a 6:1 RPM range. Below 600 RPM a hydraulic pump does not operate properly. The 3600 RPM maximum is because hydraulic pumps are typically powered by electric motors and diesel engines. 3600 RPM is a standard rotational speed for electric motors, and most diesel engines have a maximum RPM, or "redline", at or below 3600 RPM.

A maximum RPM of 3600 is thus not an issue for hydraulic pumps used in their standard environment of electric motors and diesel engines. But unless the mismatch with high-revving gasoline engines is managed, a wakeboat engine will likely overrev, and damage or destroy, a hydraulic pump.

Some embodiments of the present disclosure restrict the maximum RPM's of the wakeboat engine to a safe value for the hydraulic pump. However, since propeller rotation is directly linked to engine RPM, such a so-called "rev limiter" would also reduce the top-end speed of the wakeboat. This performance loss may be unacceptable to many manufacturers and owners alike.

Other embodiments of the present disclosure can reduce the drive ratio between the gasoline engine and the hydraulic pump, using techniques suited to the specifics of the application. For example, the circumference of the pulley for a hydraulic pump driven via a belt can be increased such that the hydraulic pump rotates just once for every two rotations of the gasoline engine, thus yielding a 2:1 reduction. For an engine with a redline of 6500 RPM, the hydraulic pump would thus be limited to a maximum RPM of 3250. While halving the maximum engine RPM's would solve the hydraulic pump's overrevving risk, it would also halve the idle RPM's to below the hydraulic pump's minimum (in these examples, from 650 to 325) and the hydraulic pump would be inoperable when the engine was idling.

The loss of hydraulic power at engine idle might not be a problem on other types of equipment. But watercraft are often required to operate at "no wake speed", defined as being in gear (the propeller is turning and providing propulsive power) with the engine at or near idle RPM's. No wake speed is specifically when many watercraft need to fill or drain ballast, so an apparatus or method that cannot fill or drain ballast at no wake speeds is unacceptable.

Since most wakeboat engines have an RPM range around 10:1, a solution is required for those applications where it is neither acceptable to rev-limit the engine nor lose hydraulic power at idle. A preferred technique should provide hydraulic power to the ballast pumps at engine idle, yet not destroy the hydraulic pump with excessive RPM's at full throttle.

Fortunately, sustained full throttle operation does not occur during the activities for which a wakeboat is normally employed (wakesurfing, wakeboarding, waterskiing, kneeboarding, etc.). On a typical wakeboat, the normal speed range for actual watersports activities may be from idle to perhaps 30 MPH—with the latter representing perhaps 4000 RPM. That RPM range would be 650 to 4000, yielding a ratio of roughly 6:1—a ratio compatible with that of hydraulic pumps.

What is needed, then, is a way to "remove" the upper portion of the engine's 10:1 RPM range, limiting the engine RPM's to the 6:1 range of the hydraulic pump. To accomplish this, some embodiments of the present disclosure use a clutch-type device to selectively couple engine power to the hydraulic pump, and (more specifically) selectively decouple engine power from the hydraulic pump when engine RPM's exceed what is safe for the hydraulic pump. The clutch could be, for example, a Warner Electric World Clutch for Accessory Drives (Altra Industrial Motion, 300 Granite Street, Braintree Mass. 02184, United States) or another clutch-type device that is suitable for the specifics of the application.

The clutch of these embodiments of the present disclosure allows the "upper portion" of the engine's 10:1 range to be removed from exposure to the hydraulic pump. Once the RPM ranges are thus better matched, an appropriate ratio of engine RPM to hydraulic pump RPM can be effected through the selection of pulley diameters, gear ratios, or other design choices.

In addition to the integer ratios described earlier, non-integer ratios could be used to better match the engine to the hydraulic pump. For example, a ratio of 1.08:1 could be used to shift the wakeboat engine's 650-4000 RPM range to the hydraulic pump's 600-3600 RPM range.

Accordingly, embodiments of the present disclosure may combine 1) a clutch's ability to limit the overall RPM ratio with 2) a ratiometric direct drive's ability to shift the limited RPM range to that required by the hydraulic pump. Hydraulic power is available throughout the entire normal operational range of the engine, and the hydraulic pump is protected from overrev damage. The only time ballast pumping is unavailable is when the watercraft is moving at or near its maximum velocity (i.e. full throttle), when watersports participants are not likely to be behind the boat. More importantly, ballast pumping is available when idling, and when watersports participants are likely to be behind the boat (i.e. not at full throttle).

Another advantage of this embodiment of the present disclosure is that the clutch may be used to selectively decouple the engine from the hydraulic pump when ballast pumping is not required. This minimizes wear on the hydraulic pump and the entire hydraulic system, while eliminating the relatively small, but nevertheless real, waste of horsepower that would otherwise occur from pressurizing hydraulic fluid when no ballast pumping is occurring.

Some embodiments that incorporate clutches use electrically actuated clutches, where an electrical signal selectively engages and disengages the clutch. When such electric clutches are installed in the engine or fuel tank spaces of a vessel, they often require certification as non-ignition, non-sparking, or explosion-proof devices. Such certified electric clutches do not always meet the mechanical requirements of the application.

To overcome this limitation, certain embodiments incorporate clutches that are actuated via other techniques such as mechanical, hydraulic, pneumatic, or other non-electric approach. A mechanically actuated clutch, for example, can be controlled via a cable or lever arm. A hydraulically or pneumatically clutch can be controlled via pressurized fluid or air if such is already present on the vessel, or from a small dedicated pump for that purpose if no other source is available.

The use of non-electrically actuated clutches relieves certain embodiments of the regulatory compliance requirements that would otherwise apply to electrical components in the engine and/or fuel tank spaces. The compatibility of the present disclosure with such clutches also broadens the spectrum of options available to Engineers as they seek to optimize the countless tradeoffs associated with wakeboat design.

A further advantage to this embodiment of the present disclosure is that, unlike direct drive ballast pumps, the power conveyed to the remotely located ballast pumps can be varied independently of the engine RPM. The hydraulic system can be sized to make full power available to the ballast pumps even at engine idle; then, the hydraulic power conveyed to the ballast pumps can be modulated separately from engine RPM's to prevent overpressure and overflow from occurring as engine RPM's increase above idle. In this way, the present disclosure solves the final challenge of conveying full (but not excessive) power to the ballast pumps across the selected operational RPM range of the engine.

Complete hydraulic systems may can include additional components beyond those specifically discussed herein. Parts such as hoses, fittings, filters, reservoirs, intercoolers, pressure reliefs, and others have been omitted for clarity but such intentional omission should not be interpreted as an incompatibility nor absence. Such components can and will be included as necessary in real-world applications of the present disclosure.

Conveyance of the hydraulic power from the hydraulic pump to the ballast pumps need not be continuous. Indeed, most embodiments of the present disclosure will benefit from the ability to selectively provide power to the various ballast pumps in the system. One manner of such control, used by some embodiments, is hydraulic valves, of which there are many different types.

Some embodiments can include full on/full off valves. Other embodiments employ proportional or servo valves where the flow of hydraulic fluid, and thus the power conveyed, can be varied from zero to full. Valves may be actuated mechanically, electrically, pneumatically, hydraulically, or by other techniques depending upon the specifics of the application. Valves may be operated manually (for direct control by the operator) or automatically (for automated control by on-board systems). Some embodiments use valves permitting unidirectional flow of hydraulic fluid, while other embodiments use valves permitting selective bidirectional flow for those applications where direction reversal may be useful.

Valves may be installed as standalone devices, in which case each valve requires its own supply and return connections to the hydraulic pump. Alternatively, valves are often assembled into a hydraulic manifold whereby a single supply-and-return connection to the hydraulic pump can be selectively routed to one or more destinations. The use of a manifold often reduces the amount of hydraulic plumbing required for a given application. The present disclosure supports any desired technique of valve deployment.

Having solved the problem of accessing engine power to pressurize hydraulic fluid that can then convey power to ballast pumps, the next step is to consider the nature of the ballast pumps that are to be so powered.

The conveyed hydraulic power must be converted to mechanical power to drive the ballast pump. In hydraulic embodiments of the present disclosure, this conversion is accomplished by a hydraulic motor.

It is important to emphasize the differences between electric and hydraulic motors, as this highlights one of the many advantages of the present disclosure. A typical 2 HP electric motor is over a foot long, over half a foot in diameter, and weighs nearly 50 pounds. In stark contrast, a typical 2 HP hydraulic motor such as the Parker Gresen MGG20010 (Parker Hannifin Corporation, 1775 Logan Avenue, Youngstown Ohio 44501, United States) is less than four inches long, less than four inches in diameter, and weighs less than three pounds.

Stated another way: A 2 HP electric motor is large, awkward, heavy, and cumbersome. But a 2 HP hydraulic motor can literally be held in the palm of one hand.

The weight and volumetric savings of hydraulic motors is multiplied by the number of motors required in the ballast system. In a typical system with a fill and a drain pump on two large ballast compartments, four 2 HP electric motors would consume over 1700 cubic inches and weigh approximately 200 pounds. Meanwhile, four of the above 2 HP hydraulic motors would consume just 256 cubic inches (a 85% savings) and weigh under 12 pounds (a 94% savings). By delivering dramatic savings in both volume and weight, hydraulic embodiments of the present disclosure give wakeboat designers vastly more flexibility in their design decisions.

With hydraulic power converted to mechanical power, hydraulic embodiments of the present disclosure must next use that mechanical power to drive the ballast pumps that actually move the ballast water.

The wakeboat industry has experimented with many different types of ballast pumps in its pursuit of better ballast systems. The two most prominent types are referred to as "impeller" pumps and "aerator" pumps.

Wakeboat "impeller pumps", also known as "flexible vane impeller pumps", can include a rotating impeller with flexible vanes that form a seal against an enclosing volute. The advantages of such pumps include the potential to self-prime even when above the waterline, tolerance of entrained air, ability to operate bidirectionally, and inherent protection against unintentional through-flow. Their disadvantages include higher power consumption for volume pumped, noisier operation, wear and periodic replacement of the flexible impeller, and the need to be disassembled and drained to avoid damage in freezing temperatures.

"Aerator pumps", also known as "centrifugal pumps", can include a rotating impeller that maintains close clearance to, but does not achieve a seal with, an enclosing volute. The advantages of such pumps include higher flow volume for power consumed, quieter operation, no regular maintenance during the life of the pump, and a reduced need for freezing temperature protection. Their disadvantages include difficulty or inability to self-prime, difficulty with entrained air, unidirectional operation, and susceptibility to unintentional through-flow.

Hydraulic embodiments of the present disclosure are compatible with both impeller and aerator pumps. Indeed, they are compatible with any type of pump for which hydraulic power can be converted to the mechanical motion required. This can include but is not limited to piston-like reciprocal motion and linear motion. In most wakeboat applications, this will be rotational motion which can be provided by a hydraulic motor mechanically coupled to a pump "body" comprising the water-handling components.

As noted earlier, existing ballast pumps used by the wakeboat industry have flow volumes well below the example 100 GPM goal expressed earlier. Indeed, there are few flexible vane impeller style pumps for any industry that can deliver such volumes. When the required volume reaches these levels, centrifugal pumps become the practical and space efficient choice and this discussion will focus on centrifugal pumps. However, this in no way limits the application of the present disclosure to other types of pumps; ultimately, moving large amounts of water is a power conveyance challenge and the present disclosure can answer that challenge for any type of pump.

The low-volume centrifugal (or aerator) pumps traditionally used by the wakeboat industry have integrated electric motors for convenience and ignition proofing. Fortunately, the pump manufacturing industry offers standalone (i.e. motorless) centrifugal pump "bodies" in sizes capable of satisfying the goals of the present disclosure.

One such centrifugal pump product line includes the 150PO at ~50 GPM, the 200PO at ~100 GPM, and 300PO at ~240 GPM (Banjo Corporation, 150 Banjo Drive, Crawfordsville Ind. 47933, United States). Using the 200PO as an example, the pump body can be driven by the shaft of a small hydraulic motor such as that as described above. The resulting pump assembly then presents a two inch water inlet and a two inch water outlet through which water will be moved when power is conveyed from the engine, through the hydraulic pump, thence to the hydraulic motor, and finally to the water pump.

Figure 3:
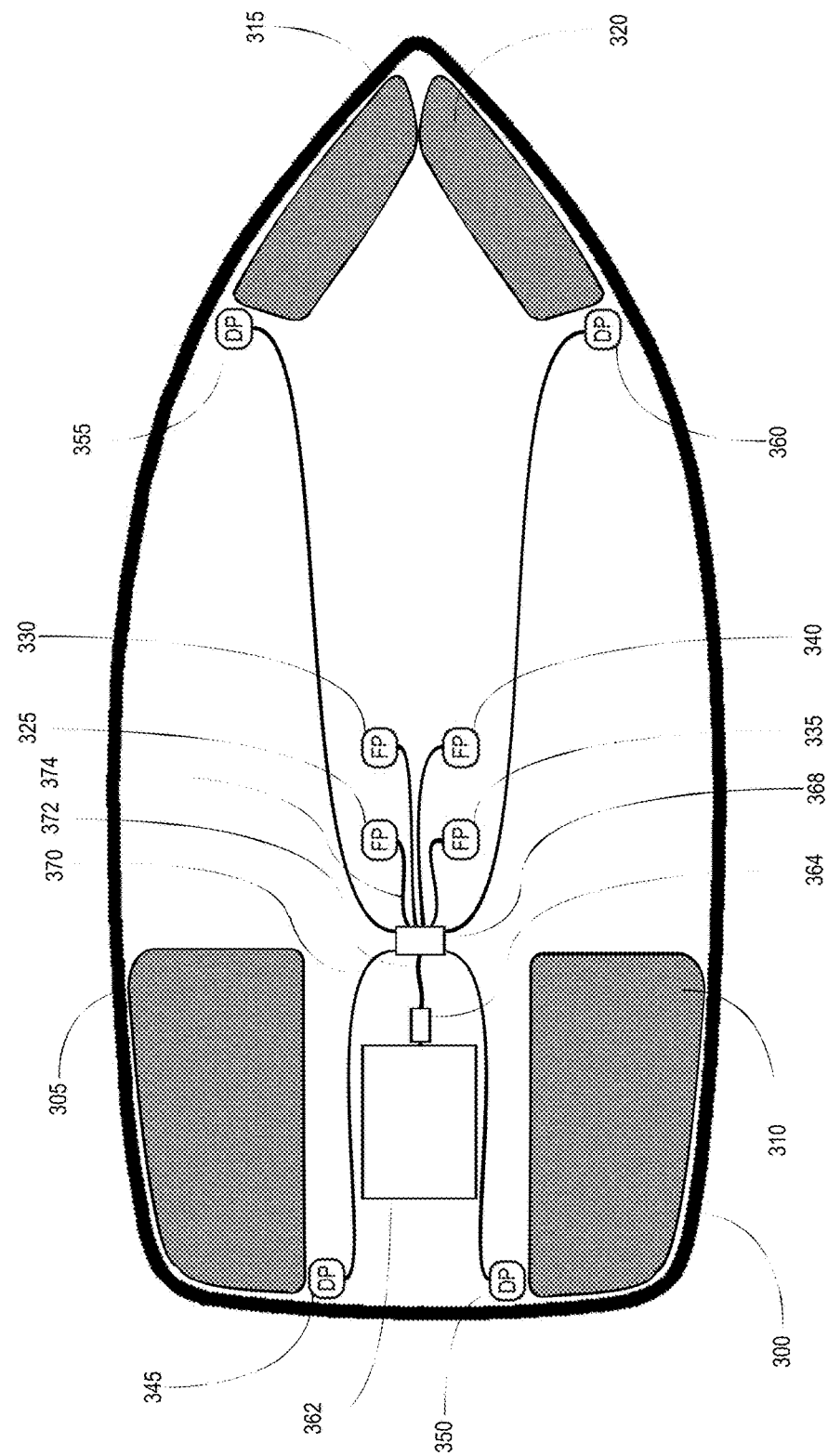
FIG. 3 illustrates one embodiment of the present disclosure using an engine powered hydraulic pump with unidirectional fill and drain ballast pumps.

For a ballast system using centrifugal pumps, generally two such pumps will be required per ballast compartment: A first for filling the compartment, and a second for draining it. FIG. 3 portrays one embodiment of the present disclosure using an engine mounted, direct drive hydraulic pump with remotely mounted hydraulic motors and separate fill and drain ballast pumps. The example locations of the ballast compartments, the fill pumps, and the drain pumps in FIG. 3 match those of other figures herein for ease of comparison and reference, but water plumbing has been omitted for clarity.

In FIG. 3, wakeboat 300 includes an engine 362 that, in addition to providing power for traditional purposes, powers hydraulic pump 364. Hydraulic pump 364 selectively converts the rotational energy of engine 362 to pressurized hydraulic fluid.

Hydraulic lines 370, 372, 374, and others in FIG. 3 can include supply and return lines for hydraulic fluid between components of the system. Hydraulic lines in this and other figures in this disclosure may include stiff metal tubing (aka "hardline"), flexible hose of various materials, or other material(s) suitable for the specific application. For convenience, many wakeboat installations employing the present disclosure will use flexible hose and thus the figures illustrate their examples as being flexible.

Continuing with FIG. 3, hydraulic lines 372 convey hydraulic fluid between hydraulic pump 364 and hydraulic manifold 368. Hydraulic manifold 368 can be an assembly of hydraulic valves and related components that allow selective routing of hydraulic fluid between hydraulic pump 364 and the hydraulic motors powering the ballast pumps.

Hydraulic-powered filling and draining of ballast compartment 305 will be referenced by way of example for further discussion. Similar operations would, of course, be available for any other ballast compartments in the system.

Remaining with FIG. 3, when it is desired to fill ballast compartment 305, the appropriate valve(s) in hydraulic manifold 368 are be opened. Pressurized hydraulic fluid thus flows from hydraulic pump 364, through the supply line that is part of hydraulic line 372, through the open hydraulic valve(s) and/or passages(s) that is part of hydraulic manifold 368, through the supply line that is part of hydraulic line 374, and finally to the hydraulic motor powering fill pump 325 (whose ballast water plumbing has been omitted for clarity).

In this manner, mechanical engine power is conveyed to fill pump 325 with no intervening, wasteful, and expensive conversion to or from electric power.

Exhaust hydraulic fluid from the hydraulic motor of fill pump 325 flows through the return line that is part of hydraulic line 374, continues through the open hydraulic valve(s) and/or passage(s) that are part of hydraulic manifold 368, though the return line that is part of hydraulic line 372, and finally back to hydraulic pump 364 for repressurization and reuse. In this manner, a complete hydraulic circuit is formed whereby hydraulic fluid makes a full "round trip" from the hydraulic pump, through the various components, to the load, and back again to the hydraulic pump.

As noted elsewhere herein, some common components of a hydraulic system, including but not limited to filters and reservoirs and oil coolers, have been omitted for the sake of clarity. It is to be understood that such components would be included as desired in a functioning system.

Draining operates in a similar manner as filling. As illustrated in FIG. 3, the appropriate valve(s) in hydraulic manifold 368 are opened. Pressurized hydraulic fluid is thus provided from hydraulic pump 364, through the supply line that is part of hydraulic line 372, through the open hydraulic valve(s) and/or passages(s) that are part of hydraulic manifold 368, through the supply line that is part of hydraulic line 370, and finally to the hydraulic motor powering drain pump 345 (whose ballast water plumbing has been omitted for clarity).

In this manner, mechanical engine power is conveyed to drain pump 345 with no intervening, wasteful, and expensive conversion to or from electric power.

Exhaust hydraulic fluid from the hydraulic motor of drain pump 345 flows through the return line that is part of hydraulic line 370, continues through the open hydraulic valve(s) and/or passage(s) that are part of hydraulic manifold 368, thence though the return line that is part of hydraulic line 372, and finally back to hydraulic pump 364 for repressurization and reuse. Once again, a complete hydraulic circuit is formed whereby hydraulic fluid makes a full "round trip" from the hydraulic pump, through the various components, to the load, and back again to the hydraulic pump. Engine power thus directly drives the drain pump to remove ballast water from the ballast compartment.

For a typical dual centrifugal pump implementation, the first pump (which fills the compartment) has its inlet fluidly connected to a throughhull fitting that permits access to the body of water surrounding the hull of the wakeboat. Its outlet is fluidly connected to the ballast compartment to be filled. The ballast compartment typically has a vent near its top to allow air to 1) escape from the compartment during filling, 2) allow air to return to the compartment during draining, and 3) allow excessive water to escape from the compartment in the event of overfilling.

In some embodiments, this fill pump's outlet connection is near the bottom of the ballast compartment. In these cases, a check valve or other unidirectional flow device may be employed to prevent unintentional backflow through the pump body to the surrounding water.

In other embodiments, the fill pump's outlet connection is near the top of the ballast compartment, often above the aforementioned vent such that the water level within the compartment will drain through the vent before reaching the level pump outlet connection. This configuration can prevent the establishment of a syphon back through the fill pump body while eliminating the need for a unidirectional flow device, saving both the cost of the device and the flow restriction that generally accompanies them.

Centrifugal pumps often require "priming", i.e. a certain amount of water in their volute, to establish a flow of water when power is first applied. For this reason, some embodiments of the present disclosure locate the fill pump's inlet below the waterline of the hull. Since "water finds its own level", having the inlet below the waterline causes the fill pump's volute to naturally fill from the surrounding water.

However, certain throughhull fittings and hull contours can cause a venturi effect which tends to vacuum, or evacuate, the water backwards out of a fill pump's throughhull and volute when the hull is moving. If this happens, the fill pump may not be able to self-prime and normal ballast fill operation may be impaired. Loss of pump prime is a persistent problem faced by the wakeboat industry and is not specific to the present disclosure.

To solve the priming problem, some embodiments of the present disclosure selectively route a portion of the engine cooling water to an opening in the pump body, thus keeping the pump body primed whenever the engine is running. In accordance with example implementations, one or more pumps can be operatively associated with the engine via water lines. FIG. 3 depicts one such water line 380 conveying water from engine 362 to ballast pump 335 (for clarity, only a single water line to a single ballast pump is shown). If a venturi or other effect causes loss of water from the pump body, the engine cooling water will constantly refill the pump body until its fill level reaches its inlet, at which point the excess will exit to the surrounding body of water via the inlet throughhull. If no loss of water from the pump body occurs, the engine cooling water will still exit via the inlet throughhull.

This priming technique elegantly solves the ballast pump priming problem whether a priming problem actually exists or not, under varying conditions, with no user intervention or even awareness required. The amount of water required is small, so either fresh (cool) or used (warm) water from the engine cooling system may be tapped depending upon the specifics of the application and the recommendation of the engine manufacturer. Water used for priming in this manner drains back to the surrounding body of water just as it does when it otherwise passes through the engine's exhaust system.

Other embodiments obtain this pump priming water from alternative sources, such as a small electric water pump. This is useful when engine cooling water is unavailable or inappropriate for pump priming, such as when the engine has a "closed" cooling system that does not circulate fresh water from outside. The source of priming water may be from the water surrounding the hull, one or more of the ballast compartments, a freshwater tank aboard the vessel, a heat exchanger for the engine or other component, or another available source specific to the application. FIG. 3 depicts such a water pump 382, providing priming water via water line 384 to pump 340 (for clarity, only a single water line to a single ballast pump is shown).

In certain embodiments, a check valve or other unidirectional flow device is installed between the source of the priming water and the opening in the pump body. For example, engine cooling system pressures often vary with RPM and this valve can prevent backflow from the ballast water to the engine cooling water.

Some embodiments incorporate the ability to selectively enable and disable this flow of priming water to the ballast pump. This can be useful if, for example, the arrangement of ballast compartments, hoses, and other components is such that the pressurized priming water might unintentionally flow into a ballast compartment, thus changing its fill level. In such cases the priming function can be selectively enabled and disabled as needed. This selective operation may be accomplished in a variety of ways, such as electrically (powering and/or depowering a dedicated electric water pump), mechanically (actuating a valve), or other means as suited to the specifics of the application.

The second pump in the dual centrifugal pump example (which drains the compartment) has its inlet fluidly connected to the ballast compartment to be drained. Its outlet is fluidly connected to a throughhull fitting that permits disposal of drained ballast water to the outside of the hull of the wakeboat.

Some embodiments of the present disclosure locate this drain pump's inlet connection near the bottom of the ballast compartment. The pump body is generally oriented such that it is kept at least partially filled by the water to be potentially drained from the compartment, thus keeping the pump body primed. In some embodiments where such a physical arrangement is inconvenient, the fill pump priming technique described above may be optionally employed with the drain pump.

The present disclosure is not limited to using two centrifugal pumps per ballast compartment. As noted earlier, other pump styles exist and the present disclosure is completely compatible with them. For example, if a reversible pump design of sufficient flow was available, the present disclosure could optionally use a single such pump body to both fill and drain a ballast compartment instead of two separate centrifugal pumps for fill and drain. Most hydraulic motors can be driven bidirectionally, so powering a reversible pump body in either the fill or drain direction is supported by the present disclosure if suitable hydraulic motors are employed.

Figure 4:
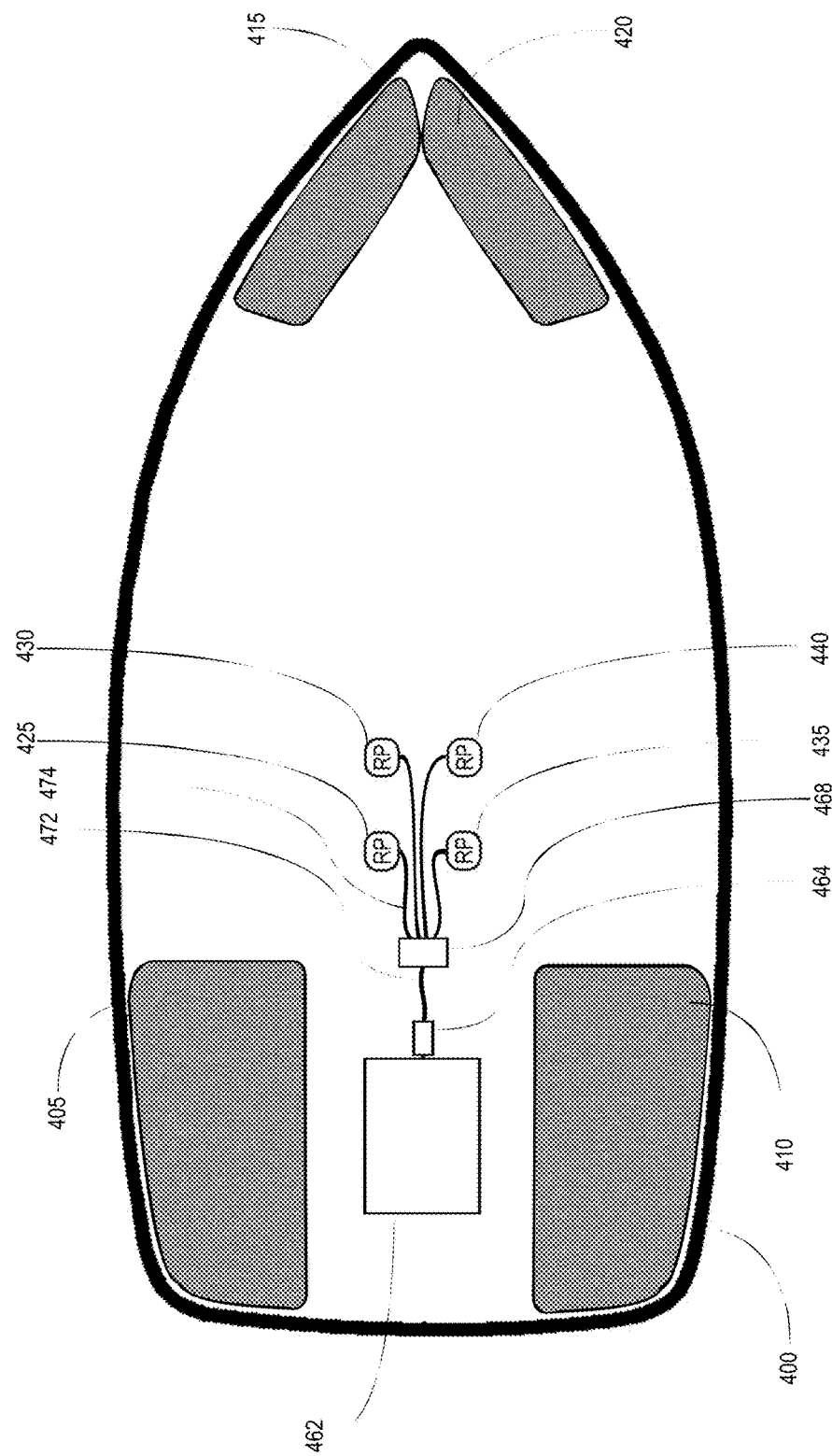
FIG. 4 illustrates one embodiment of the present disclosure using an engine powered hydraulic pump powering reversible ballast pumps.

FIG. 4 portrays one embodiment of the present disclosure using an engine mounted, direct drive hydraulic pump with remotely mounted hydraulic motors and a single reversible fill/drain ballast pump per compartment. The example locations of the ballast compartments, the fill pumps, and the drain pumps in FIG. 4 match those of other figures herein for ease of comparison and reference, but water plumbing has been omitted for clarity.

In FIG. 4, wakeboat 400 includes an engine 462 that, in addition to providing power for traditional purposes, powers hydraulic pump 464. Hydraulic pump 464 selectively converts the rotational energy of engine 462 to pressurized hydraulic fluid.

Hydraulic lines 472, 474, and others in FIG. 4 can include supply and return lines for hydraulic fluid between components of the system. Hydraulic lines 472 convey hydraulic fluid between hydraulic pump 464 and hydraulic manifold 468. Hydraulic manifold 468, as introduced earlier, is an assembly of hydraulic valves and related components that allow selective routing of hydraulic fluid between hydraulic pump 464 and the hydraulic motors powering the ballast pumps. Unlike hydraulic manifold 368 of FIG. 3, however, hydraulic manifold 468 of FIG. 4 can include bidirectional valves that selectively allow hydraulic fluid to flow in either direction.

Hydraulic-powered filling and draining of ballast compartment 405 will be used for further discussion. Similar operations would, of course, be available for any other ballast compartments in the system.

Remaining with FIG. 4: When it is desired to fill ballast compartment 405, the appropriate valve(s) in hydraulic manifold 468 are be opened. Pressurized hydraulic fluid thus flow in the "fill" direction from hydraulic pump 464, through the supply line that is part of hydraulic line 472, through the open hydraulic valve(s) and/or passages(s) that is part of hydraulic manifold 468, through the supply line that is part of hydraulic line 474, and finally to the hydraulic motor powering reversible pump (RP) 425, whose ballast water plumbing has been omitted for clarity.

Since hydraulic manifold 468 is providing flow to reversible pump 425 in the fill direction, reversible pump 425 draws water from the surrounding body of water and moves it to ballast compartment 405. In this manner, mechanical engine power is conveyed to the hydraulic motor powering reversible pump 425 with no intervening, wasteful conversion to or from electric power.

Exhaust hydraulic fluid from the hydraulic motor powering reversible pump 425 flows through the return line that is part of hydraulic line 474, continues through the open hydraulic valve(s) and/or passage(s) that are part of hydraulic manifold 468, though the return line that is part of hydraulic line 472, and finally back to hydraulic pump 464 for repressurization and reuse.

During draining with a single reversible ballast pump per compartment, the same hydraulic line 474 is used but the flow directions are reversed. Continuing with FIG. 4, the appropriate valve(s) in hydraulic manifold 468 are opened. Pressurized hydraulic fluid thus flows from hydraulic manifold 468—but in this case, in the opposite direction from that used to power reversible pump 425 in the fill direction.

Thus the roles of the supply and return lines that are part of hydraulic line 474 are reversed from those during filling. When draining, the hydraulic fluid from hydraulic manifold 468 flows toward the hydraulic motor powering reversible pump 425 via what was, during filling, the return line that is part of hydraulic line 474. Likewise, exhaust hydraulic fluid from the hydraulic motor powering reversible pump 425 flows through the return line that is part of hydraulic line 474, continues through the open hydraulic valve(s) and/or passage(s) that are part of hydraulic manifold 468, thence though the return line that is part of hydraulic line 472, and finally back to hydraulic pump 464 for repressurization and reuse.

Once again, a complete hydraulic circuit is formed whereby hydraulic fluid makes a full "round trip" from the hydraulic pump, through the various components, to the load, and back again to the hydraulic pump. When employing reversible ballast pumps, however, the direction of hydraulic fluid flow in supply and return lines that are part of hydraulic line 474 reverses depending upon which direction the ballast pump is intended to move water.

Some embodiments of the present disclosure use one or more ballast pumps to move water between different ballast compartments. Adding one or more "cross pumps" in this manner can dramatically speed adjustment of ballast.

Figure 5:
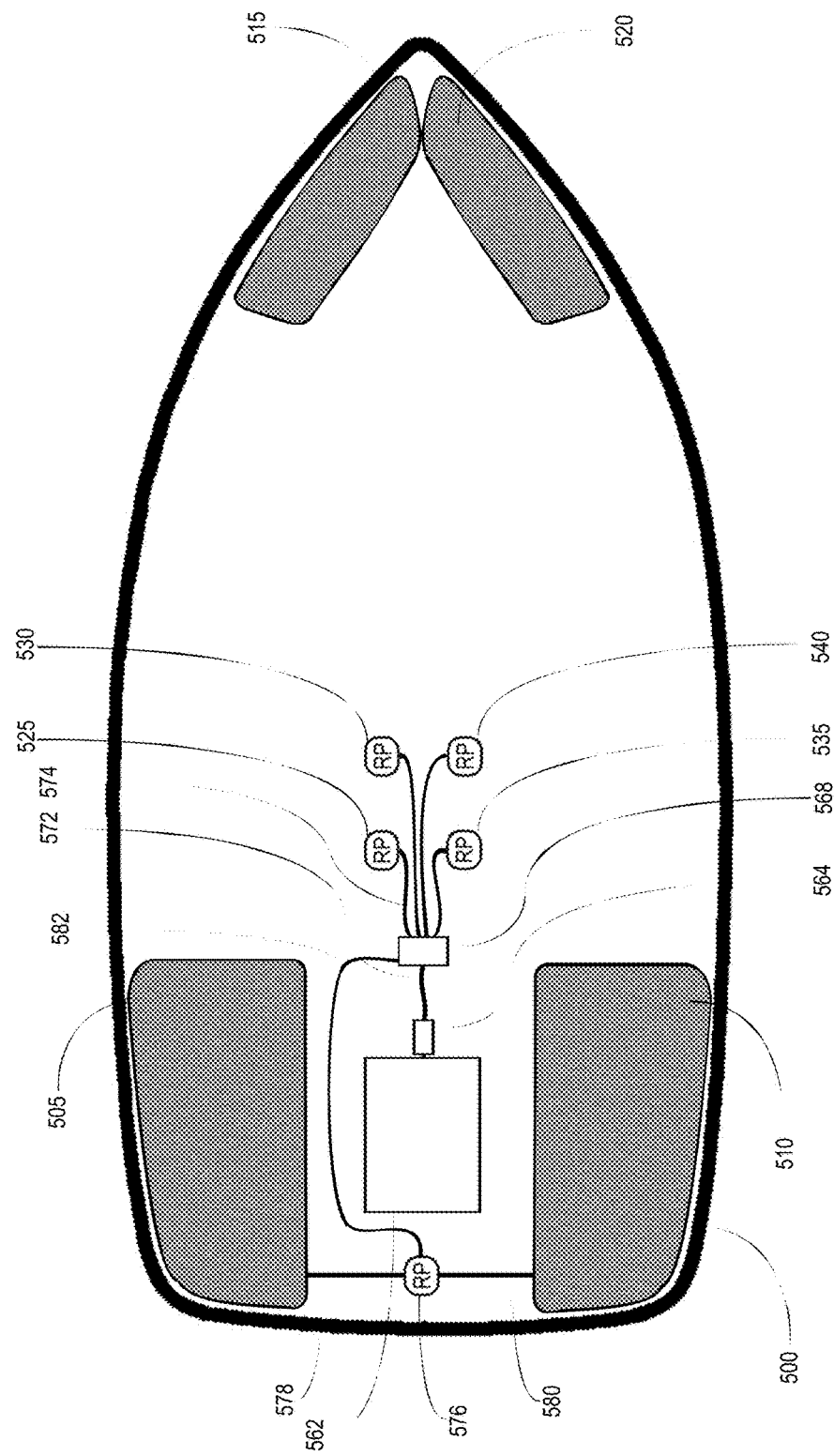
FIG. 5 illustrates one embodiment of the present disclosure using an engine powered hydraulic pump powering a reversible ballast cross pump between two ballast compartments.

FIG. 5 illustrates one embodiment. Once again, engine 562 provides power to hydraulic pump 564, which provides pressurized hydraulic fluid to hydraulic manifold 568. Ballast pump 576, a reversible ballast pump powered by a hydraulic motor, has one of its water ports fluidly connected to ballast compartment 505. The other of its water ports is fluidly connected to ballast compartment 510. Rotation of pump 576 in one direction will move water from ballast compartment 805 to ballast compartment 510; rotation of pump 576 in the other direction will move water in the other direction, from ballast compartment 510 to ballast compartment 505.

Operation closely parallels that of the other reversible pumps in previous examples. When hydraulic manifold 568 allows hydraulic fluid to flow through hydraulic line 582 to the hydraulic motor powering ballast pump 576, pump 576 will move water in the associated direction between the two ballast compartments. When hydraulic manifold 568 can be configured to direct hydraulic fluid to flow through hydraulic line 582 in the opposite direction, the hydraulic motor powering pump 576 will rotate in the opposite direction and pump 576 will move water in the opposite direction.

Other embodiments of the present disclosure accomplish the same cross pumping by using two unidirectional pumps, each with its inlet connected to the same ballast compartment as the other pump's outlet. By selective powering of the hydraulic motor powering the desired ballast pump, water is transferred between the ballast compartments.

Some embodiments of the present disclosure include a traditional electric ballast pump as a secondary drain pump for a ballast compartment. This can provide an electrical backup to drain the compartment should engine power be unavailable. The small size of such pumps can also permit them to be mounted advantageously to drain the final portion of water from the compartment, affording the wakeboat designer more flexibility in arranging the components of the overall system.

Some embodiments of the present disclosure include the ability to detect fluid in the ballast plumbing. This can act as a safety mechanism, to ensure that ballast draining operations are proceeding as intended. It can also help synchronize on-board systems with actual ballast filling and draining, since there can be some delay between the coupling of power to a ballast pump and the start of actual fluid flow. The flow sensor can be, for example, a traditional inline impeller-style flow sensor; this type of sensor may also yield an indication of volume.

Figure 6:
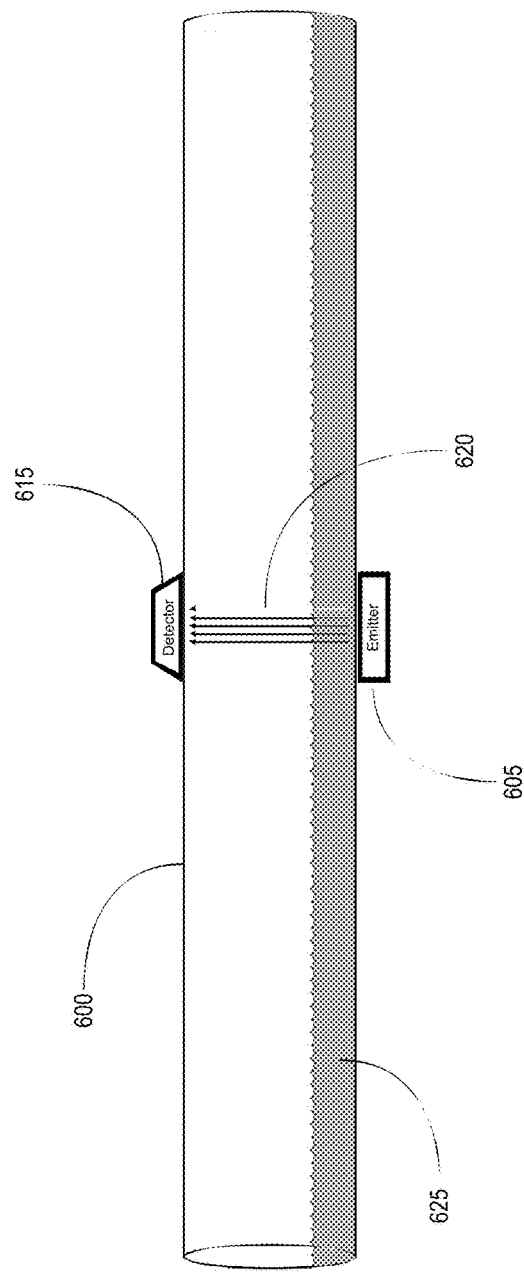
FIG. 6 illustrates one embodiment of the present disclosure using optical sensors to detect the presence of water in ballast plumbing.

Other embodiments use optical techniques. FIG. 6 illustrates one example of an optical emitter on one side of a transparent portion of the ballast plumbing with a compatible optical detector on the other side. Such an arrangement can provide a non-invasive indication of fluid in a pipe or hose, thereby confirming that ballast pumping is occurring.

In FIG. 6, conduit 600 can include a portion of the ballast plumbing to be monitored. Conduit 600 could be a pipe or hose of generally optically transparent (to the wavelengths involved) material such as clear polyvinyl chloride, popularly known as PVC (product number 34134 from United States Plastic Corporation, 1390 Neubrecht Road, Lima, Ohio 45801), or another material which suits the specific application. Conduit 600 is mounted in the wakeboat to naturally drain of fluid when the pumping to be monitored is not active.

Attached to one side of conduit 600 is optical emitter 605. Emitter 605 can be, for example, an LTE-302 (Lite-On Technology, No. 90, Chien 1 Road, Chung Ho, New Taipei City 23585, Taiwan, R.O.C.) or another emitter whose specifications fit the specifics of the application. Attached to the other side, in line with emitter 605's emissions, is optical detector 615. Detector 615 can be, for example, an LTE-301 (Lite-On Technology, No. 90, Chien 1 Road, Chung Ho, New Taipei City 23585, Taiwan, R.O.C.) or another emitter whose specifications fit the specifics of the application. Ideally, the emitter and detector will share a peak wavelength of emission to improve the signal to noise ratio between the two devices.

It should be noted that the transparent portion of the ballast plumbing need only be long enough to permit the installation of emitter 605 and detector 615. Other portions of the ballast plumbing need not be affected.

Continuing with FIG. 6, emissions 620 from emitter 605 thus pass through the first wall of conduit 600, through the space within conduit 600, and through the second wall of conduit 600, where they are detected by detector 615. When fluid is not being pumped, conduit 600 will be almost entirely devoid of ballast fluid and emissions 620 will be minimally impeded on their path from emitter 605 to detector 615.

However, as fluid 625 is added to conduit 600 by pumping operations, the optical effects of fluid 625 will alter emissions 620. Depending upon the choice of emitter 605, detector 615, and the wavelengths they employ, the alterations on emissions 620 could be one or more of refraction, reflection, and attenuation, or other effects. The resulting changes to emissions 620 are sensed by detector 615, allowing for the presence of the pumped fluid 625 to be determined. When pumping is done and conduit 600 drains again, emissions 620 are again minimally affected (due to the absence of fluid 625) and this condition too can be detected.

Figure 7:
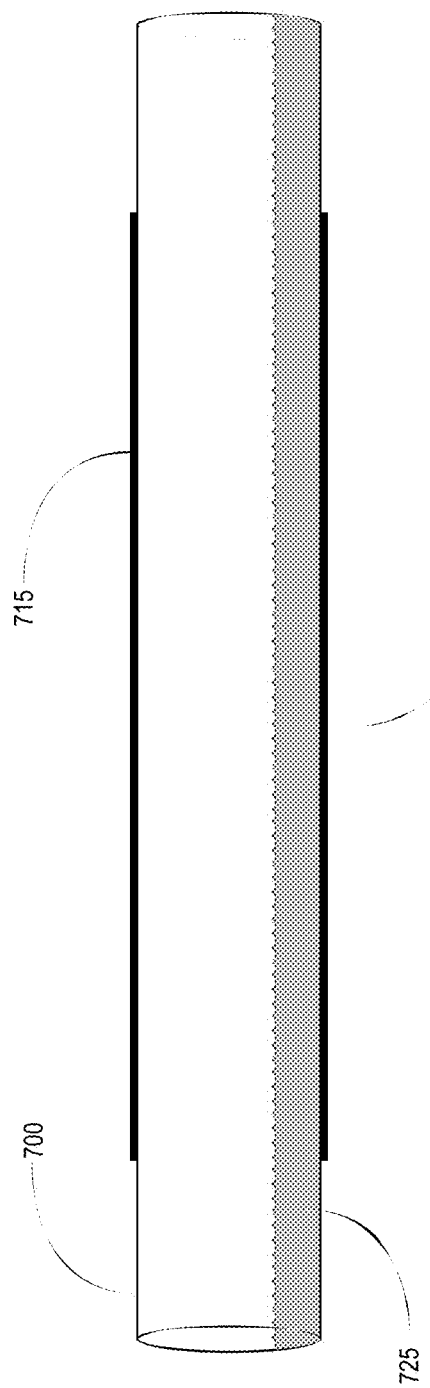
FIG. 7 illustrates one embodiment of the present disclosure using capacitance to detect the presence of water in ballast plumbing.

Another non-invasive technique, employed by some embodiments and shown in FIG. 7, is a capacitive sensor whereby two electrical plates are placed opposite each other on the outside surface of a nonconductive pipe or hose. The capacitance between the plates varies with the presence or absence of fluid in the pipe or hose; the fluid acts as a variable dielectric. This change in capacitance can be used to confirm the presence of fluid in the pipe or hose.

In FIG. 7, conduit 700 can include a nonconductive material. Capacitive contacts 705 and 715 are applied to opposite sides of the outside surface of conduit 700. Contacts 705 and 715 can include a conductive material and can be, for example, adhesive backed metalized mylar, copper sheeting, or another material suited to the specifics of the application.

The length and width of contacts 705 and 715 are determined by 1) the specifics of conduit 700 including but not limited to its diameter, its material, and its wall thickness; and 2) the capacitive behavior of the ballast fluid to be pumped. The surface areas of contacts 705 and 715 are chosen to yield the desired magnitude and dynamic range of capacitance given the specifics of the application.

When fluid is not being pumped, conduit 700 will be almost entirely devoid of ballast fluid and the capacitance between contacts 705 and 715 will be at one (the "empty") extreme of its dynamic range. However, as fluid 725 is added to conduit 700 by pumping operations, the fluid 725 changes the dielectric effect in conduit 700, thus altering the capacitance between contacts 705 and 715. When conduit 700 is filled due to full pumping being underway, the capacitance between contacts 705 and 715 will be at the "full" extreme of the dynamic range. The resulting changes to the capacitance allow the presence of the pumped fluid 725 to be determined. When pumping is done and conduit 700 drains again, the capacitance returns to the "empty" extreme (due to the absence of fluid 725) and this condition too can be detected.

Other sensor types can be easily adapted for use with the present disclosure. Those specifically described herein are meant to serve as examples, without restricting the scope of the sensors that may be employed.

Some existing ballast systems have attempted to estimate the amount of fluid in a ballast compartment. A common approach is to multiply the nominal rate of pump flow by the length of time that the ballast pump is powered. Such a scheme might take the 800 GPH (13.33 gallons per minute) pump mentioned earlier in this specification, power it for one minute, and presume that 13.33 gallons of ballast water has been transferred.

This so-called "timer" based scheme suffers from numerous inaccuracies. For example, the flow rate of electric ballast pumps can vary with the applied voltage. The applied voltage can vary dramatically depending upon the state of charge of the wakeboat battery, and even moreso if the engine is running (since the alternator generates a higher voltage than even a fully charged battery).

Ballast pump flow rate can also be affected by hull velocity. A hull moving through the water can cause the intake of the pump to experience a positive or negative pressure against which the pump must then work. A positive pressure may cause an increase in the pump's effective flow rate, while a negative pressure may cause a decrease in the pump's effective flow rate, even if all other variables remain unchanged. And this effect can vary, often in a nonlinear manner, with differences in hull velocity and angle.

The positioning of the pump connection to the ballast compartment can yield further errors. A pump which adds ballast via a fitting at the bottom of a ballast compartment can experience increasing backpressure as the compartment fills due to the increased PSI of the accumulating height, or "head", of the water. A pump may thus deliver a significantly higher effective flow rate when the associated ballast compartment is more nearly empty than when it is more nearly full because the pump is working against a larger backpressure from the ballast compartment.

Obstructions in throughhull fittings, ballast hoses, or even within the ballast pump itself can create additional uncertainty. Bodies of water used for wakesports are seldom filtered, and are instead teeming with natural and manmade debris that can be vacuumed into the ballast system to cause unpredictable and even variable flow rates in a short period of time. Meanwhile, a timer-based system just keeps ticking its clock.

Problems with timer-based schemes can compound and lead to cumulative errors. Consider the following scenario: A timer-based system runs the aforementioned 13.33 GPM electric ballast pump for three minutes while the engine is running, meaning its electric ballast pumps are running from (higher) alternator voltage. Presume the electric ballast pump does indeed pump at 13.33 GPM when powered by the (higher) alternator voltage. The timer-based system multiplies the pump flow rate by the duration (13.33 GPM×3 minutes=40 gallons) and estimates an 80 gallon ballast compartment is 50% full.

Later, the ballast is partially drained while the engine is off, meaning its electric ballast pumps are now running from (lower) battery voltage and thus do not move as much water per unit time. The timer-based system runs the same ballast pump for 1.5 minutes, which it then estimates to have removed (13.33 GPM×1.5 minutes=) 20 gallons, which it displays as 25% full. However, due to the (lower) battery voltage, the pump could not drain at its full rate—and so there is some (unknown) additional percentage beyond 25% in the ballast tank. No one knows how much.

Still later, the ballast may be refilled when the hull is moving through the water causing a venturi-based backpressure condition at the pump intake. But this backpressure may be offset by the higher alternator voltage (since the engine is moving the hull through the water). Or not. Or perhaps only partially offset, depending upon the velocity of the hull. Or the ballast may be drained when the engine is on, yielding a different drainage rate than in the previous paragraph when the engine was off and the voltage was lower.

Such filling and draining operations recur repeatedly throughout a session on the water as wakesport participants and conditions change. The resulting compounding combinations of inaccuracies and variables can lead to almost ridiculous errors, such as the helm display of the wakeboat indicating "50% full" when the ballast compartment is actually overflowing or empty. These inaccuracies of timer-based systems are the basis for countless complaints and expressions of customer dissatisfaction in the online communities of their associated manufacturers.

Beyond the reputation damage, however, such ill-advised reliance upon timers to (mis)estimate the status of ballast compartments can lead to equipment damage. Many ballast pumps—particularly those employing flexible vane impellers—caution against running "dry" due to the damage such operation causes. A timer-based draining system that erroneously believes a ballast compartment is still 50% full may continue to run the associated ballast pump dry for many minutes until sufficient time has expired that the timer "believes" the ballast compartment is drained, damaging the pump the entire time.

A timer-based scheme can also fail to recognize outright equipment faults. A timer-based system will seek to fill a ballast compartment without regard as to whether the ballast compartment is actually being filled. Many ballast compartments are hidden below floors or behind bulkheads to minimize their intrusion into passenger or storage space. If a leak or breakage exists in the hose, a timer-based system could blindly pump many minutes of water directly into the bilge of the wakeboat—potentially creating a bilge water depth in excess of design parameters and threatening electrical and mechanical systems. Passengers may be none the wiser since the wakeboat would, indeed, be sinking deeper into the water as expected. A timer-based system, because it is merely estimating the status of the ballast compartment, could run out its timers regardless of the increasing danger.

Timers are not the only "estimation" schemes used with ballast compartments. Various other approaches have also been tried, including but not limited to water pressure (exerted by the water in a compartment), air pressure (in a compartment being compressed by incoming water), weight (of the compartment or the water therein), current and/or voltage (parameters of electric ballast pumps as a proxy for flow rate), and flow (gauges seeking to measure the volume of water pumped but which can be fooled by air bubbles and other discontinuities). It is telling that the costs, maintenance, and other challenges of these methods have largely resulted in their abandonment by wakeboat manufacturers in favor of timer-based systems, despite the latter's numerous faults.

Central to the problems suffered by many of the other schemes is that they measure a secondary effect and estimate the water level from that, rather than measure what actually matters: The level of the fluid in a ballast compartment. By focusing on this primary criterion, many of the problems and errors plaguing secondary measurement schemes can be eliminated.

Previous attempts to actually measure the fluid level in a ballast compartment have been fraught with difficulties. For example, some efforts have employed traditional fuel tank "sending units" comprising a float which rises and falls with the fluid level. Others have relied upon the fluid's conductivity by putting electrodes in direct contact with the ballast fluid and measuring changes in conductivity as the fluid level changes.

Such ill-fated efforts share a common failing: They place critical components in direct contact with the fluid. As mentioned earlier herein, bodies of water—fresh and salt alike—are usually rife with debris, contaminants, and even microscopic lifeforms that are pumped directly into ballast compartments along with the water. Sensitive electronic and mechanical sensors do not tolerate such contamination well, and the result is often degradation and eventual failure. Sometimes maintenance can restore some degree of operation temporarily, but it is a losing battle against time and exposure to the very environment in which wakeboats are naturally used.

As with the secondary-measuring systems mentioned above, these attempts at measuring the actual ballast fluid level have been largely abandoned in favor of timer-based systems which, while widely acknowledged as flawed, do not suffer from the ravages of environmental exposure and do not require frequent and ongoing maintenance.

What is needed is a ballast fluid measurement technique that has no contact with the fluid being measured. The elimination of moving parts, and their associated ongoing maintenance requirements, would also be an advantage. So too would be compatibility with multiple forms of ballast compartments whether "hard tanks" (compartments which hold their shape whether empty or full), "fat sacs" (compartments in the form of bags which can be collapsed), integrated into the hull itself, or some combination thereof. It would also be advantageous to accommodate changes in the capacity of ballast compartments, to afford manufacturers and end users the ability to recalibrate the definition of "empty" and "full" if the capacity of a ballast compartment is changed.

To address these needs and overcome the limitations of the aforementioned attempts, some embodiments of the present disclosure include the ability to actually measure the fluid level in a ballast compartment.

Figure 8:
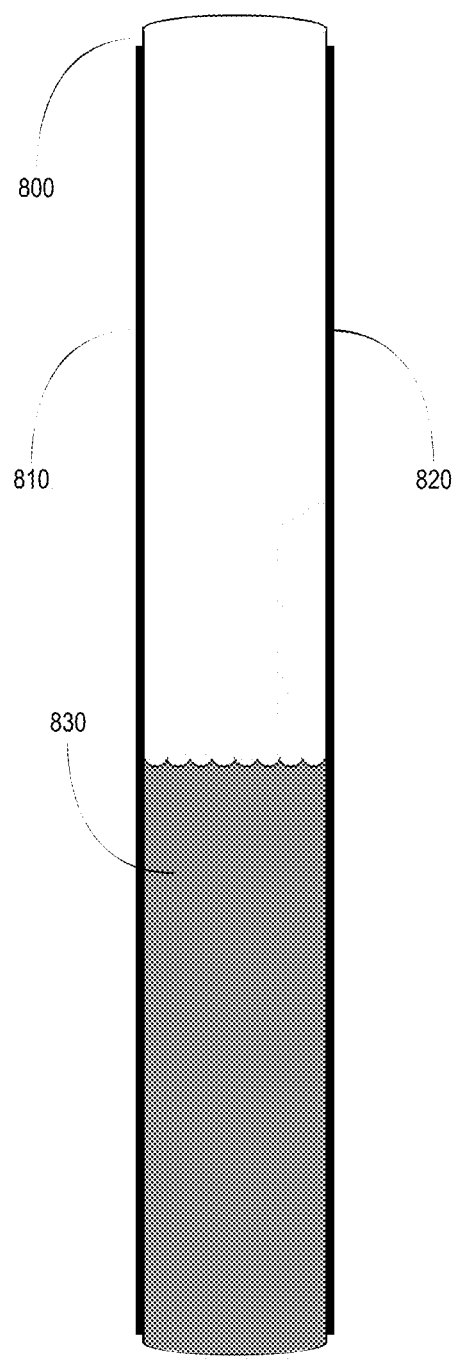
FIG. 8 illustrates a fluid sensing chamber according to an embodiment of the disclosure.

FIG. 8 illustrates a portion of an assembly that can be used as part of at least one non-invasive technique employed by some embodiments. Electrodes 810 and 820 reside on the outside surface of a nonconductive sensing chamber 800. The chamber could, for example, be a tube comprised of a plastic, fiberglass, rubber, or other material suited to the specifics of the application. In some embodiments the fluid changes the electrical or other relationship between the electrodes as the amount of fluid in the chamber varies. This relationship may be used to measure the amount of fluid in the sensor chamber.

In the embodiment represented in FIG. 8, chamber 800 can include a nonconductive material. The cross sectional shape of chamber 800 may be circular, rectangular/square, or another shape suitable to the specifics of the application.

In some embodiments, electrodes 810 and 820 are applied to the outside surface of sensor chamber 800. Electrodes 810 and 820 may include a conductive material and may be, for example, adhesive backed metalized mylar, copper sheeting, aluminum or other metal tape, or another material suited to the specifics of the application.

The electrodes which are isolated from, and do not contact, the fluid within chamber 800 may be fabricated from a wide range of materials without having to consider corrosion or other electrochemical reactions between the fluid and the electrode material. Separately, the material choice for sensor chamber 800 can optimize for compatibility with the fluid contained within. The ability of the present disclosure to separate the function of fluid containment from fluid sensing affords much greater latitude in material selection and implementation as compared to earlier sensor attempts.

The present disclosure affords great flexibility in design, assembly, and manufacture. As just one example, electrode 810 and 820 need not always be installed on the outermost surface of sensor chamber 800; instead, in some embodiments, one or more electrodes may be embedded within the material of the chamber. Likewise, some embodiments may utilize more than two electrodes to achieve various improvements in sensing, tolerance, or reliability. Some embodiments may use a combination of isolated and non-isolated electrodes if contact with the fluid by at least one electrode proves advantageous. A variety of arrangements may be employed as long as the conductive portion(s) of at least one electrode is/are isolated from the fluid.

Continuing with the example embodiment illustrated in FIG. 8, the length, width, and positioning of electrodes 810 and 820 may be affected several criteria including 1) the specifics of chamber 800 including but not limited to its diameter, its material, and its wall thickness, 2) the characteristic of the fluid to be measured, and 3) the number of electrodes being used. As just one example, some embodiments may measure the electrical capacitance between the electrodes, with the fluid acting as a dielectric and its changes in level within sensor chamber 800 changing the capacitance between the electrodes. An embodiment employing the measurement of electrical capacitance may select the surface areas of contacts 810 and 820 to yield the desired magnitude and dynamic range of capacitance given the specifics of the application.

Figure 9:
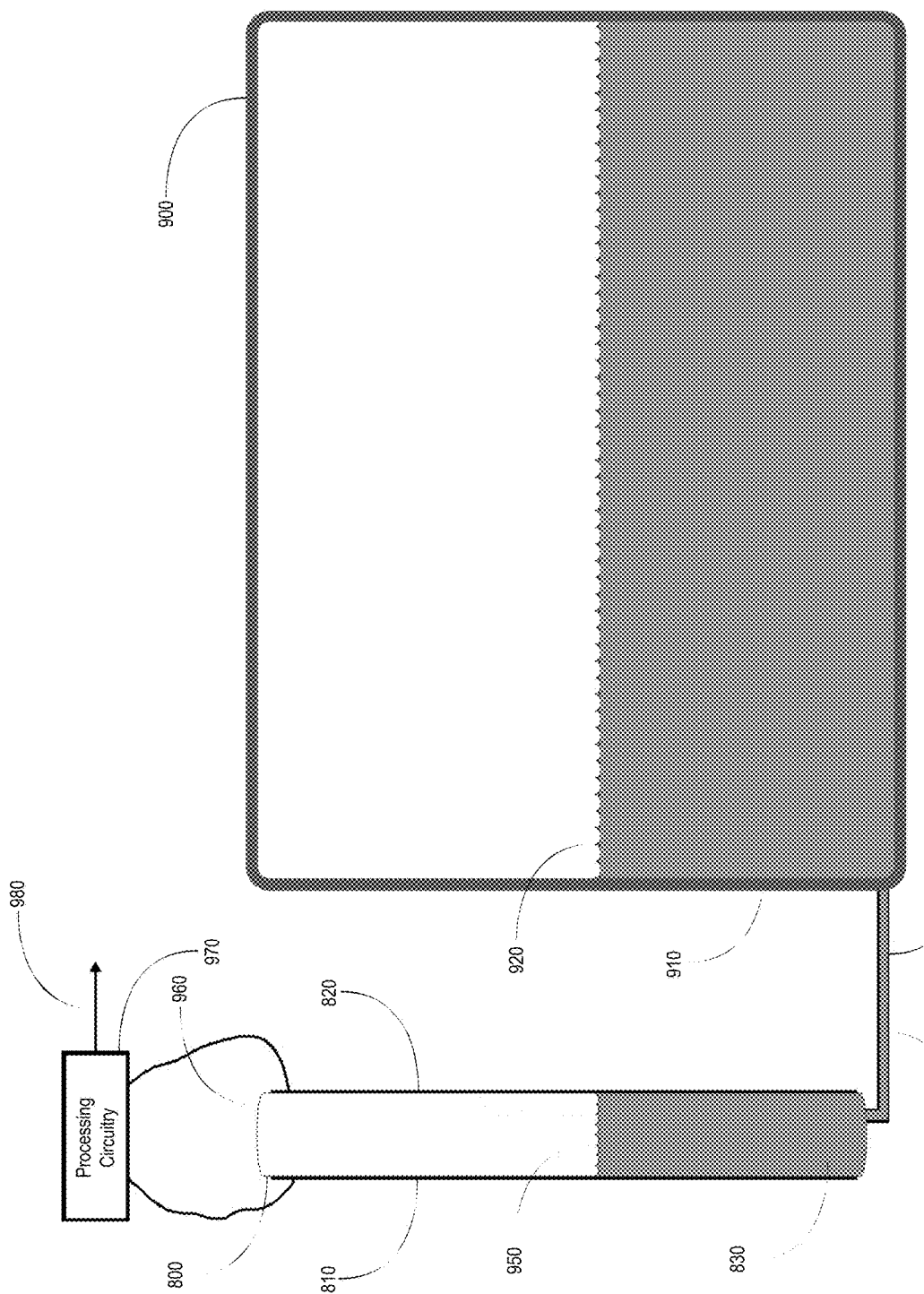
FIG. 9 illustrates a portion of a ballast compartment measurement assembly according to an embodiment of the disclosure.

Referring to FIG. 9, in some embodiments, sensor chamber 800 may be advantageously integrated with ballast compartment 900 and electrodes 810 and 820 installed directly on ballast compartment 900.

Continuing with the example of electrical capacitance, when the fluid level within sensor chamber 800 is at or below some useful lower level, the capacitance between electrodes 810 and 820 will be at one (the "empty") extreme of its dynamic range. As fluid 830 begins to rise within chamber 800, the changing amount of fluid 830 changes the dielectric effect in chamber 800, thus altering the capacitance between contacts 810 and 820. As the level of fluid in chamber 800 continues to increase, the change in capacitance between electrodes 810 and 820 likewise continues to change. Finally, when the fluid level within chamber 800 reaches some useful upper level, the electrical capacitance between contacts 810 and 820 may be considered at the "full" extreme of the dynamic range.

From the foregoing it is clear that a range of values results from the range of fluid fill levels within chamber 800. Some embodiments of the present disclosure may use processing circuitry to measure this range of measurement values and may selectively convert to an alternate unit of measure. One example, used by some embodiments, is a range of fill values from zero percent through one hundred percent. Other units of measure may also be used including but not limited to depth, capacity, volume, and/or mass. Various embodiments may locate such processing circuitry directly on sensor chamber 800, near electrodes 810 and 820, or at a more distant location as suited to the needs of the application.

Some embodiments of the present disclosure measure other, or additional, fluid characteristics including but not limited to inductance, acoustic behavior, mass, and resistance. The nature of the electrodes may change depending upon the specifics of the fluid characteristic(s) being measured. The present disclosure can utilize any fluid characteristic(s) that vary with the amount of fluid in the sensor chamber, and the choice of characteristic(s) may differ with the requirements of the specific application.

Some embodiments may use processing circuitry to selectively manipulate the electrode measurements and/or the alternate units of measure. Examples include but are not limited to filtering; averaging; correction for environmental conditions such as temperature, pressure, salinity, and/or impurity; and other adjustments as deemed suitable for the specifics of the application.

Some embodiments may employ multiple pairs of electrodes to detect multiple discrete fluid levels, such as 10%, 20%, and so forth. The particular quantity and arrangement of the electrodes may be selected based upon the desired behavior of the sensor and other characteristics specific to the application.

In some embodiments, the basic sensor of FIG. 8 can be employed as a ballast level sensor by suitably connecting it to a ballast compartment. FIG. 9 illustrates one type of connection used by some embodiments. Sensor chamber 800, electrodes 810 and 820, and fluid 830 are shown. Ballast compartment 900 is also shown partially filled with ballast fluid 910 and resulting fluid surface 920. Ballast pump(s), hoses, vents, and other details have been omitted from this and other Figures for clarity.

Continuing with the type of embodiment illustrated in FIG. 9, fluid surface 920 rises as fluid 910 fills ballast compartment 900. Sensor chamber 800 is connected to ballast compartment 900 via hose or pipe 930 such that the ballast fluid can flow between ballast compartment 900 and sensor chamber 800. Based on the principle that "water finds its common level", fluid surface 920 in ballast compartment 900 will match the level of fluid surface 950 in sensor chamber 800. This occurs in both dynamic conditions (e.g. a pump is actively transferring fluid into or out of ballast compartment 900) and static conditions (e.g. no pumping is occurring and the amount of fluid in ballast compartment 900 is not changing). Expressed differently, such embodiments do not require active pressurization, in contrast to previous sensor attempts which use "balloons" or "bladders" or other elastomeric envelopes.

As described earlier, sensor chamber 800 has electrodes 810 and 820 on its exterior surface. As the amount of fluid 830 in sensor chamber 800 rises and falls, the relationship between electrodes 810 and 820 varies. Some embodiments can comprise processing circuitry 970, connected to electrodes 810 and 820, to measure this relationship and selectively convert it to various alternate units of measure including but not limited to units of capacity such as percentage, units of distance such as inches or centimeters, and units of mass such as pounds or grams.

In some embodiments, the measured relationship and/or the alternative units of measure can be selectively communicated via connection 980 as one or more of Controller Area Network (CAN), Ethernet, RS-232, RS-423, an analog voltage, an analog current, a wireless radio frequency or optical connection, a mechanical linkage, or another form of communication as suited to the specific application. To enable the use of multiple sensor assemblies in a networked environment, some embodiments comprise selective addressing in processing circuitry 980 to uniquely identify each sensor and the data it conveys.

Figure 13:
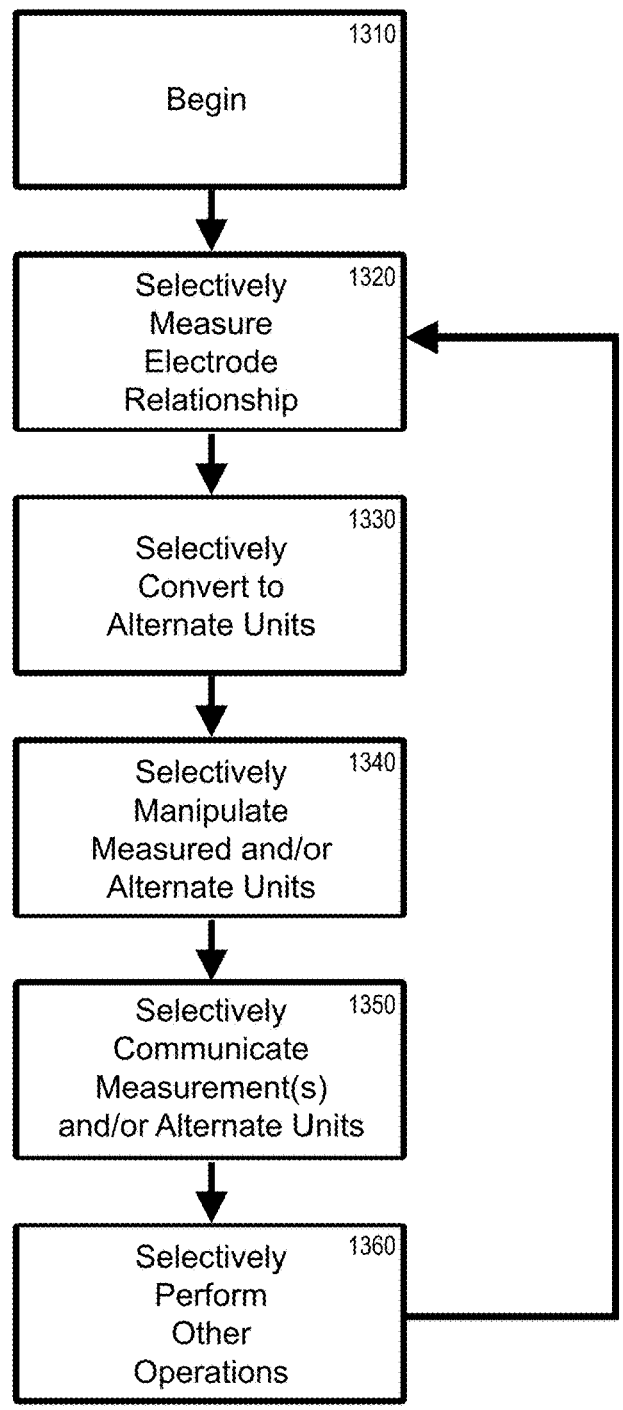
FIG. 13 illustrates an example process flow diagram for determining a fluid level within a ballast compartment according to an embodiment of the disclosure.

FIG. 13 provides an overview of an operational sequence used by processing circuitry 970 in some embodiments. Upon the application of power, a reset, or other startup trigger, processing circuitry 970 enters block 1310. Processing then proceeds to block 1320. In block 1320, the relationship between electrodes 810 and 820 may be selectively measured, and processing proceeds to block 1330. In block 1330, one or more electrode measurement(s) may be selectively converted to alternate units, and processing proceeds to block 1340. In block 1340, one or more of the electrode measurement(s) and/or the alternate unit(s) may be selectively manipulated, and processing proceeds to block 1350. In block 1350, one or more of the electrode measurement(s) and/or the alternate units may be selectively communicated via connection 980, and processing proceeds to block 1350. In block 1350, processing circuitry 970 may selectively perform other operations useful to the specifics of the application, and processing proceeds to block 1320 as described above.

The selective nature of each step shown in FIG. 13 permits some embodiments to vary the relative frequency of actions taken. For example, some embodiments may select not to communicate in block 1350 each time the opportunity arises, thus incorporating multiple measurements (from block 1320) into the data communicated in block 1350. The inverse is also possible, as when processing circuitry 970 needs to communicate via connection 980 more frequently than measurements are taken in block 1320. Likewise, the relative rate of other operations performed in block 1360 may differ from the rates required by other processing steps. The flexibility of the present disclosure accommodates such differing requirements.

Some embodiments may realize processing circuitry 970 entirely in hardware. Others may use software, with shared or dedicated hardware, to implement processing circuitry 970. Still others may accomplish this functionality via mechanical components. The specifics of the application and other requirements or restrictions may dictate the choices and combinations of components.

Some embodiments incorporate a vent 960 at the top of sensor chamber 800 to allow the free exchange of air as the volume of fluid 830 varies. When included, vent 960 may be left open to the ambient air, connected via a suitable conduit back to ballast compartment 900 (so overflow water will be routed back to the ballast compartment), connected via a suitable conduit to a throughhull fitting on the hull of the wakeboat (so overflow water will be exhausted to the surrounding water), or managed in other ways suitable for the specifics of the application.

Continuing with FIG. 9, ballast compartment 900 need not be a hard-sided tank. Ballast compartment 900 may comprise a flexible compartment, sometimes referred to in the wakeboat industry as a "fat sac", with variable internal volume that may increase or decrease based upon the amount of fluid contained within. Ballast compartment 900 may also comprise one or more chambers integrated into the wakeboat hull itself. Ballast compartment 900 may also comprise combinations of the above, or any other fluid containment device deemed suitable for the specifics of the application.

Sensor chamber 800, electrodes 810 and 820, and other components of some embodiments of the present disclosure may be resized according to the specifics of the application. For example, a taller ballast compartment 900 could require a longer sensor chamber 800 and longer electrodes 810 and 820 to measure the full dynamic range of fill levels within ballast compartment 900.

Figure 10:
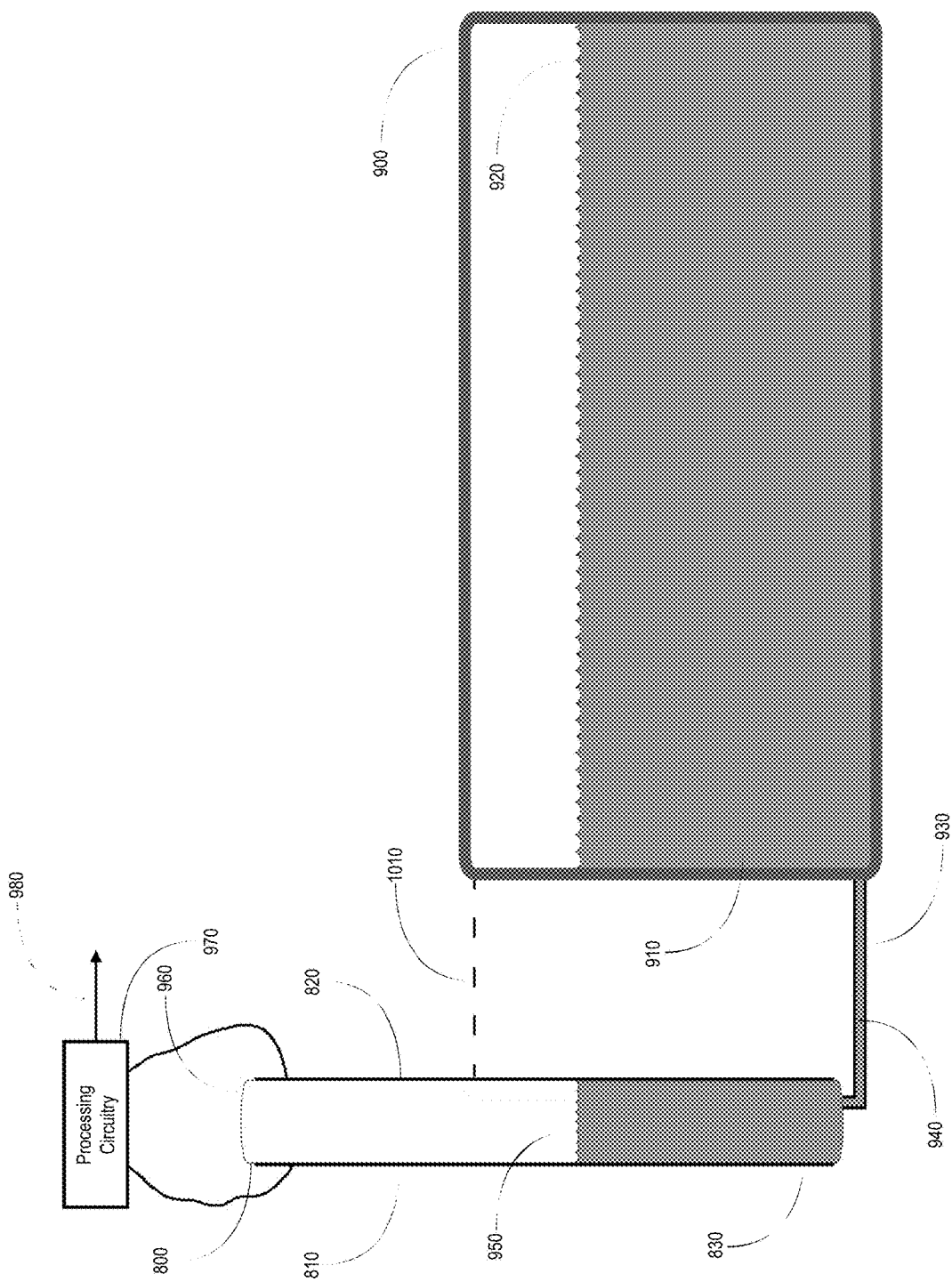
FIG. 10 illustrates another configuration of a portion of a ballast compartment measurement assembly according an embodiment of the disclosure.

Some embodiments of the present disclosure can use a longer sensor chamber 800 and electrodes 810 and 820 to measure a shorter ballast compartment 900. Referring to FIG. 10, processing circuitry 970 could recognize and selectively report maximum fill level 1010 as "full" for ballast compartment 900. Likewise, were the bottoms of electrodes 810 and 820 below the bottom of ballast compartment 900, processing circuitry 1000 could recognize and selectively report the minimum fill level as "empty".

As just one example of the foregoing, a longer sensor assembly may be desirable when an initial, factory-installed ballast compartment might be enlarged by the addition of or replacement with a supplementary ballast compartment which yields a taller overall ballast compartment. The initial installation of a longer sensor assembly may thus allow the full dynamic range of enlarged ballast compartments to be measured and reported without the expense and inconvenience of retrofitting longer sensors after the wakeboat originally leaves the factory. The process of enlarging the ballast capacity of the wakeboat can thus be simplified for the end user, giving the practicing wakeboat manufacturer a competitive advantage in the marketplace.

Figure 11:
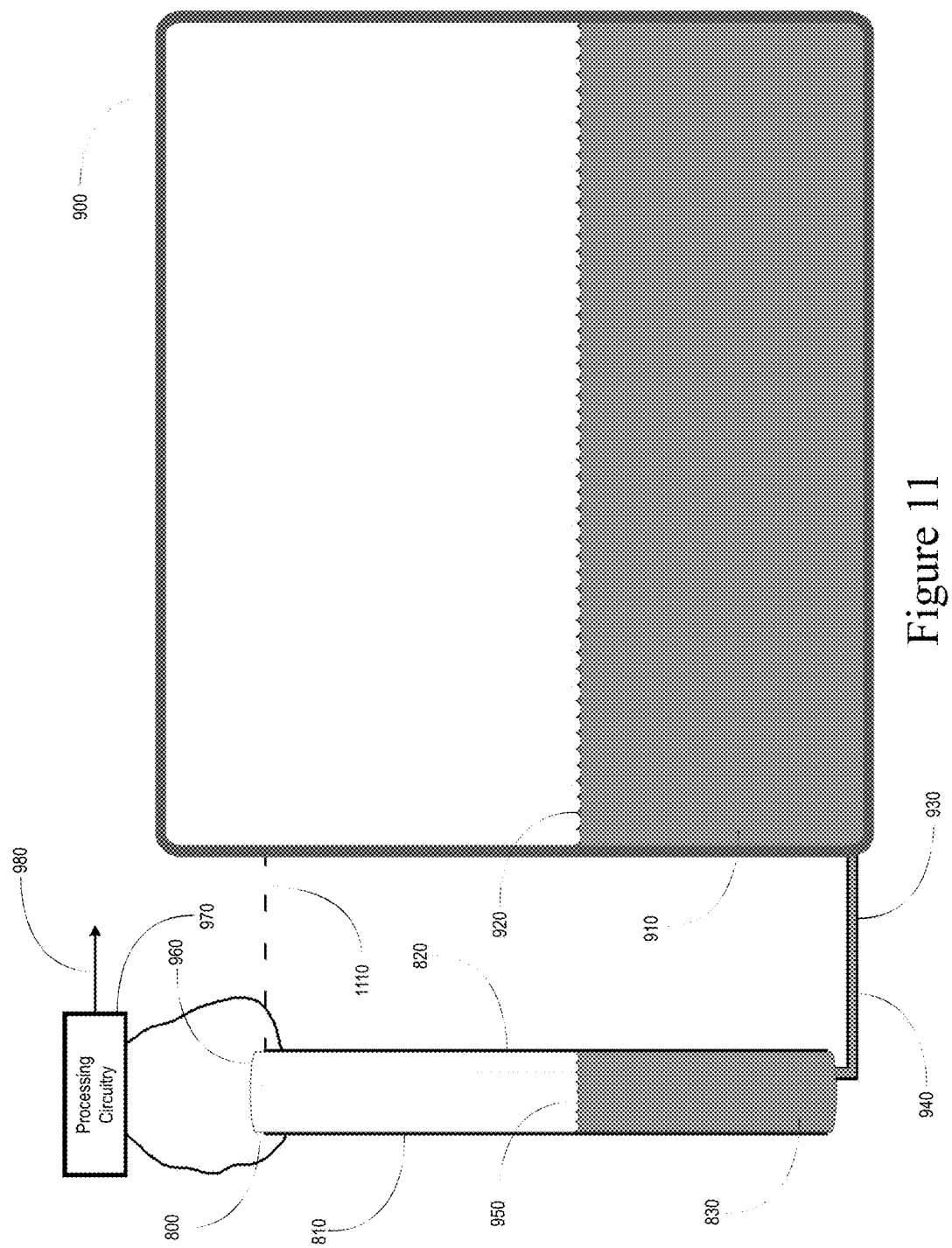
FIG. 11 illustrates yet another configuration of a portion of a ballast compartment measurement assembly according to an embodiment of the disclosure.

FIG. 11 illustrates how some embodiments can use a shorter sensor chamber 800 and electrodes 810 and 820 when it is unnecessary to measure varying fluid levels within sensor chamber 800 beyond a certain maximum. This could be the case if, for example, fluid level 1110 is considered "more than sufficient" for the intended purpose and higher levels need not be quantified. Suitable termination of vent 960 may be required if the fluid level will exceed the top of sensor chamber 800. Some embodiments may resolve this by extending sensor chamber 800 above the tops of electrodes 810 and 820.

Sensor chamber 800 need not be oriented vertically as shown in FIGS. 9-11 in relation to the ballast compartment.

Figure 12:
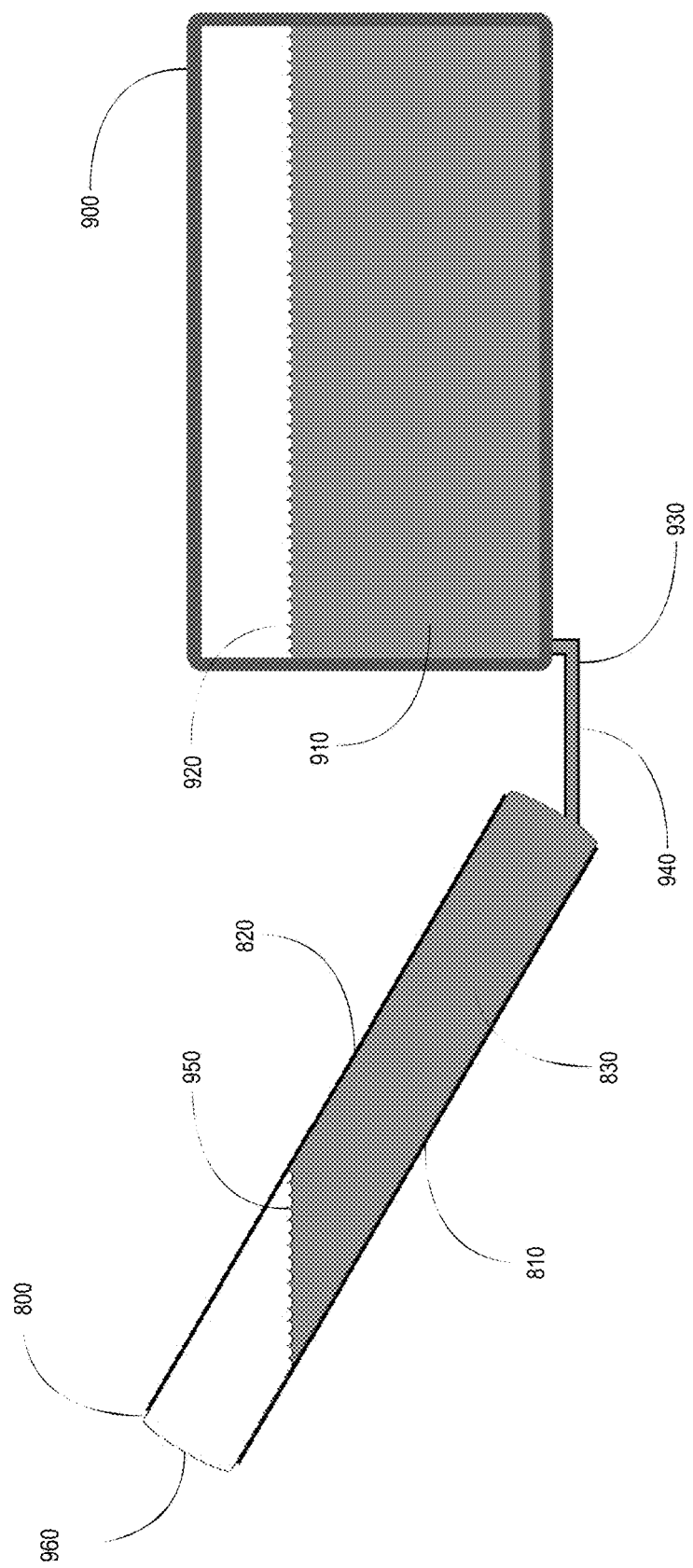
FIG. 12 illustrates still another configuration of a portion of a ballast compartment measurement assembly according to an embodiment of the disclosure.

In some embodiments, sensor chamber 800 may be at an angle relative to vertical to ease installation or accommodate other specifics of the application. For example, if a "longer" sensor is required to accommodate the height of a taller ballast compartment, some embodiments may utilize the same sensor length with a shorter ballast compartment by installing the sensor assembly at an angle as illustrated in FIG. 12. Or, it may be advantageous to the assembly of the various components of the ballast system to orient the sensor away from vertical. The dielectric operating principle is not hindered by such an installation. In this way, suitable embodiments of the present disclosure can deliver the ability to use a single-size sensor configuration in multiple physical applications, which can yield dramatic improvements in inventory management and economies of scale.

Figure 14:
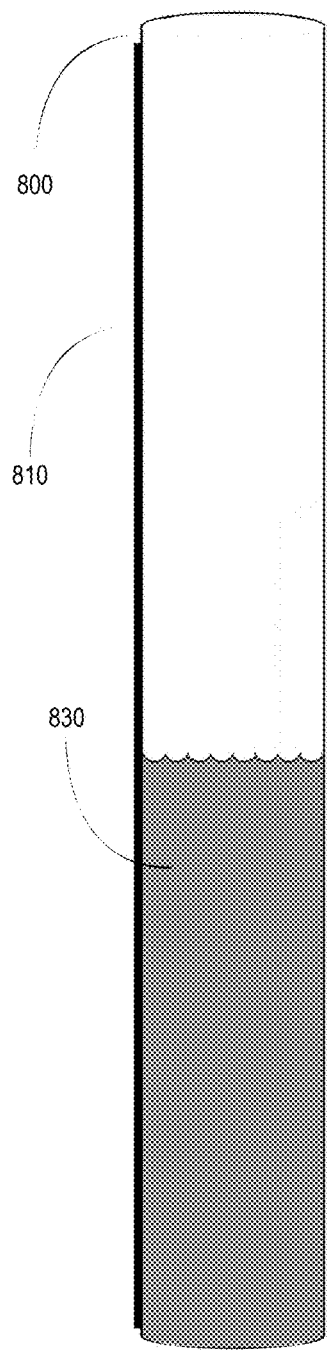
FIG. 14 illustrates another configuration of a portion of a ballast compartment measurement assembly according to an embodiment of the disclosure.

In accordance with another embodiment of the disclosure, a single electrode may be used in connection with the fluid within the sensor chamber. Accordingly, fluid 830 can be configured to act as another electrode. An example is illustrated in FIG. 14. Fluid 830 can be electrically associated to the extent necessary to facilitate the determination of fluid level as the opposing electrodes described above. Accordingly, fluid 830 can then act together with electrode 810 to form an electrical measuring pair.

Using the measurement of capacitance as an example, electrode 810 and fluid 830 may act as two plates of a capacitor. The wall of sensor chamber 800 acts as the dielectric. As the level of fluid 830 in FIG. 14 rises, the effective surface area of the capacitive plate created by fluid 830 in relation to electrode 810 also increases. Changes in the total surface area of capacitive plates changes the resulting capacitance, so the value of this capacitance is related to, and can provide an indication of, the level of fluid 830.

As with other figures herein, FIG. 14 illustrates electrode 810 as a simple line for visual clarity. It is to be understood that, as with embodiments employing multiple electrodes, the size, shape, location, and other details of electrode 810 can be varied as required by the specifics of the situation.

In applications sensitive to the number of electrodes (for cost, manufacturing, or other reasons) or where the electrical characteristics of fluid 830 make a two (or more) electrode solution less feasible, such "active fluid" embodiments may provide a practical approach to realizing the advantages of the present disclosure. The "active fluid" technique need not be limited to the measurement of capacitance; depending upon the nature of fluid 830 and the specifics of the application, the "active fluid" technique may be based on inductance, acoustic behavior, mass, resistance, or another characteristic of fluid 830.

In compliance with the statute, embodiments of the invention have been described in language more or less specific as to structural and methodical features. It is to be understood, however, that the entire invention is not limited to the specific features and/or embodiments shown and/or described, since the disclosed embodiments comprise forms of putting the invention into effect. The invention is, therefore, claimed in any of its forms or modifications within the proper scope of the appended claims appropriately interpreted in accordance with the doctrine of equivalents.

The invention claimed is:

1. A wakeboat ballast compartment fluid level sensing assembly comprising:
   a wakeboat having a hull;
   a ballast compartment associated with the hull;
   a nonconductive sensor chamber in fluidic communication with the ballast compartment; and
   at least two conductive electrodes associated with the sensor chamber, wherein at least one of the conductive electrodes is electrically isolated from fluid within the sensor chamber.

2. The wakeboat ballast compartment fluid level sensing assembly of claim 1 further comprising processing circuitry operatively coupled to the electrodes, the processing circuitry configured to measure the electrical relationship between the electrodes resulting from the fluid level within the sensor chamber.

3. The wakeboat ballast compartment fluid level sensing assembly of claim 2 wherein the electrical relationship being measured is electrical capacitance.

4. The wakeboat ballast compartment fluid level sensing assembly of claim 1 wherein the sensor chamber is oriented vertically.

5. The wakeboat ballast compartment fluid level sensing assembly of claim 2 wherein the processing circuitry is configured to selectively convert the measure of the electrical relationship between the electrodes to an alternative unit of measure.

6. The wakeboat ballast compartment fluid level sensing assembly of claim 5 wherein the alternative unit of measure is one of capacity, volume, distance, and/or mass.

7. The wakeboat ballast compartment fluid level sensing assembly of claim 5 wherein the processing circuitry further comprises a connection of at least one of Controller Area Network, Ethernet, RS-232, RS-423, analog voltage, analog current, optical, and/or radio, the processing circuitry configured to selectively communicate, using the connection, at least one of the measure of electrical relationship between the electrodes and/or the alternative unit of measure.

8. The wakeboat ballast compartment fluid level sensing assembly of claim 1 wherein the ballast compartment is defined by at least one of a hard sided compartment, a flexible sack or bag, and/or the hull walls.

9. The wakeboat ballast compartment fluid level sensing assembly of claim 1 wherein the electrodes are aligned on the sensor chamber opposing one another.

10. The wakeboat ballast compartment fluid level sensing assembly of claim 1 wherein the ballast compartment defines a total fluid capacity height and the sensor chamber defines a sensor fluid capacity height at least as tall as the total fluid capacity height of the ballast compartment.

11. A method for sensing a fluid level within a ballast compartment aboard a wakeboat, the method comprising:
    maintaining fluid communication between the ballast compartment and a sensor chamber; and
    determining the electrical communication between at least two electrodes operatively associated with the sensor chamber wherein at least one of the electrodes is electrically isolated from fluid within the sensor chamber.

12. The method of claim 11 further comprising aligning the ballast compartment and the sensor chamber along at least one vertical plane.

13. The method of claim 11 wherein the electrodes are extended along a portion of the sidewalls of the sensor chamber.

14. The method of claim 11 further comprising extending a conduit between one position on the ballast compartment and another position on the sensor chamber, the positions being different from one another.

15. The method of claim 14 wherein the one position is associated with the bottom of the ballast compartment.

16. The method of claim 11 further comprising calibrating a level of fluid within the chamber that corresponds to a level of fluid within the compartment.

17. The method of claim 11 further comprising incorporating the ballast compartment within a hull of the wakeboat.

18. The method of claim 11 wherein the electrical communication being determined comprises electrical capacitance.

19. The method of claim 18 further comprising correlating the electrical capacitance with a level of fluid within the sensor chamber.

20. The method of claim 18 further comprising correlating a level of fluid within the sensor chamber with a level of fluid within the ballast compartment.

* * * * *